US012765706B2

(12) United States Patent
Wang et al.

(10) Patent No.: US 12,765,706 B2
(45) Date of Patent: Oct. 20, 2026

(54) COOKING DEVICE

(71) Applicant: ZHUHAI UNICOOK TECHNOLOGY CO., LTD., Zhuhai (CN)

(72) Inventors: Feng Wang, Zhuhai (CN); Bo Su, Zhuhai (CN); Dongxing Li, Zhuhai (CN); Jianping Zhang, Zhuhai (CN); Zhendong Bao, Zhuhai (CN); Zhonglin Huang, Zhuhai (CN); Meitan Liu, Zhuhai (CN)

(73) Assignee: ZHUHAI UNICOOK TECHNOLOGY CO., LTD., Zhuhai (CN)

( * ) Notice: Subject to any disclaimer, the term of this patent is extended or adjusted under 35 U.S.C. 154(b) by 545 days.

(21) Appl. No.: 18/284,864

(22) PCT Filed: Apr. 6, 2022

(86) PCT No.: PCT/CN2022/085364

§ 371 (c)(1),
(2) Date: Sep. 29, 2023

(87) PCT Pub. No.: WO2022/213998

PCT Pub. Date: Oct. 13, 2022

(65) Prior Publication Data

US 2024/0180350 A1 Jun. 6, 2024

(30) Foreign Application Priority Data

Apr. 6, 2021 (CN) ......................... 202120695545.4
Jun. 17, 2021 (CN) ......................... 202121357250.2
Oct. 22, 2021 (CN) ......................... 202122563396.9

(51) Int. Cl.
*A47J 27/00* (2006.01)
*A47J 36/06* (2006.01)

(52) U.S. Cl.
CPC ............... *A47J 27/00* (2013.01); *A47J 36/06* (2013.01)

(58) Field of Classification Search
CPC ................................. A47J 36/06; A47J 27/00
(Continued)

(56) References Cited

U.S. PATENT DOCUMENTS 531,718 A * 1/1895 Detwiler et al. ..... B01J 19/0066 366/302
754,931 A * 3/1904 Meyrick, Jr. ........... B01F 35/00 366/164.4
(Continued)

FOREIGN PATENT DOCUMENTS

CN 105455606 A 4/2016
CN 109260798 A 1/2019
(Continued)

OTHER PUBLICATIONS

The search report of corresponding TW application No. 111113091, issued on Nov. 25, 2022.

*Primary Examiner* — Jimmy Chou
(74) *Attorney, Agent, or Firm* — The Sun IP Law

(57) ABSTRACT

A cooking device, which includes: a frame; a base, connected to the frame; a pot assembly, including a pot, the pot being configured to be connected to the base; a first seasoning mechanism, disposed on the frame, the first seasoning mechanism being capable of conveying solid materials into the pot; and a second seasoning mechanism, disposed on the frame, the second seasoning mechanism being capable of conveying liquid materials into the pot. During a cooking process, the cooking device may respectively put the solid materials and the liquid materials into the pot by using the first seasoning mechanism and the second seasoning mechanism, so as to replace manual material feeding. Therefore, the problems in the related art of long cooking time during
(Continued)

the using of an automatic cooking machine by a user and poor user experience are solved, thereby improving user experience.

17 Claims, 14 Drawing Sheets

(58) Field of Classification Search
USPC .............................................................. 99/324
See application file for complete search history.

(56) References Cited

U.S. PATENT DOCUMENTS

| | | | | | | |
|---|---|---|---|---|---|---|
| 821,934 | A | * | 5/1906 | Eves | C08F 6/02 | 528/496 |
| 848,209 | A | * | 3/1907 | Rossiger | A47J 37/1223 | 366/279 |
| 1,200,301 | A | * | 10/1916 | Bigelow | B01F 27/00 | 99/348 |
| 2,793,166 | A | * | 5/1957 | Hatch | C12M 29/06 | 366/273 |
| 3,120,168 | A | * | 2/1964 | Lippert | A23L 7/187 | 99/333 |
| 4,173,925 | A | * | 11/1979 | Leon | B01F 35/92 | 99/348 |
| 4,733,608 | A | * | 3/1988 | Merdy | A21B 5/03 | 99/353 |
| 5,259,300 | A | * | 11/1993 | Yajima | A47J 43/04 | 366/225 |
| 5,535,665 | A | * | 7/1996 | Wong | A47J 43/044 | 366/261 |
| 5,613,425 | A | * | 3/1997 | Krznaric | A47J 36/165 | 366/279 |
| 5,615,951 | A | * | 4/1997 | Gabriele | B01F 27/192 | 99/348 |
| 5,816,136 | A | * | 10/1998 | Stallings | A47J 36/165 | 99/335 |
| 5,921,169 | A | * | 7/1999 | Sekerich | A21B 7/005 | 99/426 |
| 6,193,410 | B1 | * | 2/2001 | Puckett, II | A63B 47/00 | 366/348 |
| 6,484,624 | B1 | * | 11/2002 | Wu | A47J 37/106 | 99/347 |
| 6,796,218 | B1 | * | 9/2004 | Pan | A47J 37/106 | 99/425 |
| 7,451,613 | B2 | * | 11/2008 | Barraclough | A23G 9/24 | 62/343 |
| 7,619,188 | B2 | * | 11/2009 | Oghafua | A47J 27/004 | 99/325 |
| 8,066,427 | B2 | * | 11/2011 | Wong | B01F 27/70 | 366/279 |
| 8,122,815 | B2 | * | 2/2012 | Wolfe | A47J 43/046 | 99/348 |
| 8,707,862 | B1 | * | 4/2014 | Oliver | A47J 36/165 | 99/348 |
| 9,693,654 | B2 | * | 7/2017 | Smith | A47J 36/34 | |
| 9,775,466 | B2 | * | 10/2017 | Zhang | A47J 37/1242 | |
| 10,441,928 | B2 | * | 10/2019 | Rigas | B01F 27/2322 | |
| 10,638,876 | B2 | * | 5/2020 | Zhang | A47J 37/049 | |
| RE48,216 | E | * | 9/2020 | Smith | A47J 36/165 | |
| 11,179,000 | B2 | * | 11/2021 | Lee | A47J 36/165 | |
| 11,198,222 | B2 | * | 12/2021 | Farid | A47J 27/004 | |
| 11,412,885 | B2 | * | 8/2022 | Wang | A47J 36/165 | |
| 11,470,991 | B2 | * | 10/2022 | Wang | A47J 44/00 | |
| 11,737,598 | B2 | * | 8/2023 | Pan | A47J 27/004 | 99/329 P |
| 11,737,602 | B2 | * | 8/2023 | Pan | A47J 37/108 | 99/329 P |
| 11,800,947 | B2 | * | 10/2023 | Wang | A47J 36/32 | |
| 11,819,158 | B2 | * | 11/2023 | Pan | A47J 37/108 | |
| 11,872,536 | B2 | * | 1/2024 | Burrow | F16M 11/10 | |
| 11,882,961 | B1 | * | 1/2024 | Smith | A47J 27/004 | |
| 12,557,940 | B2 | * | 2/2026 | Senthilnathan | A47J 27/004 | |
| 2005/0011370 | A1 | * | 1/2005 | Xu | A47J 36/165 | 99/409 |
| 2006/0219100 | A1 | * | 10/2006 | Gelfand | A47J 43/046 | 99/348 |
| 2007/0081419 | A1 | * | 4/2007 | Mou | B01F 35/55 | 366/601 |
| 2009/0007802 | A1 | * | 1/2009 | Taitler | A47J 43/06 | 99/452 |
| 2009/0064867 | A1 | * | 3/2009 | Peng | A47J 27/004 | 99/341 |
| 2009/0208621 | A1 | * | 8/2009 | Dotan | A23L 5/11 | 99/348 |
| 2011/0041710 | A1 | * | 2/2011 | Collins | A47J 43/14 | 99/500 |
| 2012/0174800 | A1 | * | 7/2012 | Montavy | A47J 43/0705 | 99/348 |
| 2012/0189745 | A1 | * | 7/2012 | DeLong | B01F 27/91 | 366/244 |
| 2012/0189746 | A1 | * | 7/2012 | DeLong | B01F 27/91 | 99/324 |
| 2013/0008321 | A1 | * | 1/2013 | Bravo | B01F 27/807 | 99/453 |
| 2015/0201787 | A1 | * | 7/2015 | Holzbauer | A47J 27/004 | 99/348 |
| 2015/0245635 | A1 | * | 9/2015 | Smith | A23G 9/46 | 426/519 |
| 2016/0367073 | A1 | * | 12/2016 | Smith | A47J 36/34 | |
| 2018/0014684 | A1 | | 1/2018 | Donarski et al. | | |
| 2020/0100621 | A1 | * | 4/2020 | He | A47J 36/32 | |
| 2020/0375392 | A1 | * | 12/2020 | Pan | A47J 37/047 | |
| 2023/0355025 | A1 | * | 11/2023 | Lee | A47J 27/004 | |
| 2024/0074619 | A1 | * | 3/2024 | Shiraki | A47J 27/14 | |

FOREIGN PATENT DOCUMENTS

| | | | | | |
|---|---|---|---|---|---|
| CN | 109393989 | A | * | 3/2019 | A47J 36/00 |
| CN | 208769535 | U | | 4/2019 | |
| CN | 109864565 | A | | 6/2019 | |
| CN | 210204394 | U | * | 3/2020 | A47J 27/00 |
| CN | 111493644 | A | * | 8/2020 | A47J 36/00 |
| CN | 211673761 | U | | 10/2020 | |
| CN | 211748736 | U | | 10/2020 | |
| CN | 215304912 | U | | 12/2021 | |
| CN | 215890488 | U | | 2/2022 | |
| CN | 216166837 | U | | 4/2022 | |
| GB | 2470914 | A | | 12/2010 | |
| TW | 201300059 | A | | 1/2013 | |

* cited by examiner

COOKING DEVICE

CROSS-REFERENCE TO RELATED APPLICATION

The disclosure claims priority to Chinese Patent Application No. 202120695545.4 filed to the China National Intellectual Property Administration on Apr. 6, 2021 and entitled "Cooking Device", to Chinese Patent Application No. 202121357250.2 filed to the China National Intellectual Property Administration on Jun. 17, 2021 and entitled "Pump Assembly, Feeding Apparatus, and Cooking System", and to Chinese Patent Application No. 202122563396.9 filed to the China National Intellectual Property Administration on Oct. 22, 2021 and entitled "Pot, and Automatic Drum Cooking System".

TECHNICAL FIELD

The disclosure relates to the technical field of kitchen devices, and in particular, to a cooking device.

BACKGROUND

Current cooking devices, such as automatic cooking machines, may only cook food materials, while seasoning is usually placed on a cooking bench or in a cabinet, such that a user needs to take and place the seasoning by himself/herself according to needs, resulting in long cooking time by the user, and poor user experience.

SUMMARY

In view of this, the disclosure provides a cooking device, which may realize the feeding of liquid materials and solid materials, thereby solving the problems in the related art of long cooking time during the using of an automatic cooking machine by a user and poor user experience.

An embodiment of the disclosure provides a cooking device, which includes: a frame; a base, connected to the frame; a pot assembly, including a pot, the pot being configured to be connected to the base; a first seasoning mechanism, disposed on the frame, the first seasoning mechanism being capable of conveying solid materials into the pot; and a second seasoning mechanism, disposed on the frame, the second seasoning mechanism being capable of quantifying liquid materials, so as to convey the liquid materials into the pot.

In some embodiments, the cooking device further includes: a driving mechanism, where the pot is configured to be pivotally connected to the base, the pot assembly further includes a rotary shaft rotatably disposed relative to the base, the rotary shaft is disposed at a bottom of the pot, and the driving mechanism is connected to the rotary shaft or the pot in a driving manner, so as to provide rotational power; and a stabilization assembly, disposed on the base, where the stabilization assembly includes at least two stabilization structures sleeving on the rotary shaft, so as to reduce the shaking amplitude of the rotary shaft during rotation.

In some embodiments, in a front-rear direction of the cooking device, the first seasoning mechanism and the second seasoning mechanism are located on a rear side of the pot assembly; in a height direction of the cooking device, the second seasoning mechanism is located between the first seasoning mechanism and the pot assembly; and in a horizontal direction, the first seasoning mechanism is disposed above the pot in a protruding manner relative to the second seasoning mechanism.

In some embodiments, the first seasoning mechanism includes: at least one feeding device, disposed on the frame and configured to supply the solid materials. Each of the at least one feeding device includes a discharging port located above the pot; in the horizontal direction, the discharging port protrudes toward a front side of the cooking device; in the height direction of the cooking device, the discharging port is located between the first seasoning mechanism and the pot assembly. There are one discharging port or multiple discharging ports, any one of the one discharging port or multiple discharging ports is right above an opening of the pot at a feeding station; and a projection of the any one of the one discharging port or multiple discharging ports on a horizontal plane is in a center region, and a ratio of an area of the center region to an area of the opening of the pot is less than 3/4.

In some embodiments, each of the at least one feeding device includes: a first seasoning box, where the first seasoning box is at least partially disposed in a fourth accommodating cavity of the frame, so as to store the solid materials; and a conveying portion. One end of the conveying portion communicates with the first seasoning box, and the other end of the first seasoning storage portion communicates the other end of the conveying portion communicates with the pot; the conveying portion includes a support portion, a feeding tube, and a discharging cylinder, and the discharging cylinder is provided with a discharging port; the support portion is fixedly disposed on the first seasoning box, and the support portion is provided with a through hole; and one end of the feeding tube penetrates the support portion and communicates with the first seasoning box, and the other end of the first seasoning storage portion communicates the other end of the feeding tube communicates with the discharging cylinder.

In some embodiments, a seasoning falling position of the first seasoning mechanism is within a second range, and an area of the second range is less than an area of the center region; and/or there are at least two feeding devices, the at least two feeding devices are distributed in an arc shape, and the feeding devices located at two ends of the arc are disposed farther ahead relative to the feeding device located in a center of the arc; or there are at least two feeding devices, at least two discharging ports of the multiple discharging ports are distributed in an arc shape, and the discharging ports located at two ends of the arc are disposed farther ahead relative to the discharging port located in a center of the arc. An orientation of the feeding tube is set to be symmetrically distributed along a preset plane, and the preset plane is a plane that passes through center points of a plurality of feeding devices in a left-right direction and extends in the front-rear direction.

In some embodiments, the second seasoning mechanism includes: a first mounting structure, disposed on the frame and provided with a first activity region; a first joint, where the first joint is capable of moving in the first activity region, the first joint communicates with one end of a first pipeline, and the other end of the first pipeline adapts to communicate with the pot; a second seasoning box, disposed on the frame and configured to accommodate the liquid materials; a second mounting structure, disposed on the second seasoning box and provided with a second mounting space; and a second joint. The second joint is capable of moving in the second mounting space, and the second joint communicates with the second seasoning box by means of a second pipeline. In the height direction of the cooking device, the first joint and the second joint are located between the first seasoning mechanism and the second seasoning mechanism.

In some embodiments, the first mounting structure includes a first stop portion and a second stop portion, and the first stop portion and the second stop portion form the first activity region. The second stop portion includes at least two protruding posts; the first joint is provided with limit holes corresponding to the protruding posts; the first joint sleeves on the protruding posts by means of the limit holes. The first stop portion includes a first stop plate, and the first stop plate is located between the first joint and the second joint, so as to prevent the first joint from falling off from the protruding posts. The second mounting structure includes a limit base, the second joint is mounted on the second seasoning box by means of the limit base, and the second mounting structure is fixedly disposed on a side surface of the second seasoning box. The second seasoning box and the second mounting structure both are disposed in a third accommodating cavity.

In some embodiments, the second seasoning mechanism further includes: a pump body, disposed on the first pipeline and disposed in the third accommodating cavity of the frame; a first valve body, disposed on the first pipeline and located between the pump body and a nozzle assembly, where the first valve body is disposed close to the pump body; a second valve body, disposed on an end of the second pipeline that stretches into the second seasoning box. The first valve body and the second valve body both are one-way valves, and an opening pressure of the first valve body is greater than an opening pressure of the second valve body.

In some embodiments, when the second seasoning mechanism is configured to feed sauces, the second seasoning mechanism includes a pump and a controller. The pump includes: a housing, provided with an accommodating cavity, and an inlet and an outlet, which communicate with the accommodating cavity; an impeller, disposed in the accommodating cavity and comprising blades; and a driving portion, connected to the impeller and configured to drive the impeller to rotate to cause the blades to be in contact with an inner wall surface of the housing to cause flexible deformation, so as to output seasoning via the outlet by passing through the inlet and the accommodating cavity. The controller is connected to the driving portion, and configured to control a working state of the driving portion to quantify the seasoning and output the seasoning.

In some embodiments, the housing includes: a pump body, where the inlet and the outlet are provided on the pump body; a support, connected to the pump body and provided with a first mounting hole, where the driving portion penetrates the first mounting hole; and an end cover, connected to the pump body. The end cover and the support are located on two sides of the pump body and form the accommodating cavity with the pump body. An inner wall surface of the pump body forms a circular structure, and the first mounting hole is radially disposed eccentric with a center of the circular structure; or the inner wall surface of the pump body forms an eccentric structure, the first mounting hole is disposed opposite to a center of the eccentric structure, and the eccentric structure includes an arc structure or at least two arc structures with different radii; or the inner wall surface of the pump body forms the eccentric structure, the first mounting hole is radially disposed eccentric with the center of the eccentric structure, and the eccentric structure includes an arc structure or at least two arc structures with different radii.

In some embodiments, the second seasoning mechanism further includes: a funnel seasoning bin, including a first port located at a bottom of the funnel seasoning bin, where the first port is in contact with and communicates with the inlet; or a first seasoning storage portion and a telescoping tube. The first seasoning storage portion is disposed above the housing, an upper end of the first seasoning storage portion is provided with a seasoning replenishment port, and the other end of the first seasoning storage portion communicates with the inlet by means of the telescoping tube.

In some embodiments, the pot includes a pot body and a pot scraping member; the pot scraping member is provided on an inner wall of the pot body; the pot scraping member is attached to the inner wall of the pot body; and the pot body is capable of moving in a circumferential direction of the pot body relative to the pot scraping member, so as to cause the pot scraping member to scrape food materials attached to the inner wall of the pot body.

In some embodiments, the pot scraping member includes a framework and an outer cover; the outer cover is sleeved on the framework; the framework applies a pressure to the outer cover, so as to cause the outer cover to be attached to the inner wall of the pot body; and the outer cover is made of a flexible material.

In some embodiments, the framework includes a first end and a second end. The pot body includes a bottom of the pot and the opening of the pot. The first end is provided at the bottom of the pot, and the second end is provided at the opening of the pot. The pot further includes a fixing member, and the fixing member is connected to the second end, so as to limit the second end in the circumferential direction of the pot body. A limit space is provided in the fixing member, and the second end is provided in the limit space. The fixing member includes a limit column, and the limit column is located in the limit space. The second end is provided with a pressing piece, and the pressing piece is disposed on an outer wall of the second end that is close to a central axis of the pot body. The pressing piece is provided with a mating hole. The limit column stretches into the mating hole. An elastic member is sleeved on the limit column. The elastic member applies, to the pressing piece, an elastic force towards the inner wall of the pot body, so as to cause the pot scraping member to be attached to the inner wall of the pot body.

In some embodiments, the pressing piece protrudes from an outer wall of the second end in a first direction; the mating hole is in a strip shape; the mating hole extends in the first direction; a total distance, in a circumferential direction of the pot, between an inner wall of the mating hole and the limit column is A, a length of the mating hole in the circumferential direction of the pot is B, and a ratio of A to B is 0-0.2; and a total distance, in the first direction, between the mating hole and the limit column is C, the length of the mating hole in the first direction is D, and a ratio of C to D is 0.3-0.9.

In some embodiments, a plane perpendicular to the central axis of the pot body is a first plane; and a direction of the force applied to the pressing piece by the elastic member is at an angle A to the first plane, wherein 20° SA$45°.

In some embodiments, a fixed base is provided at the bottom of the pot. The pot further includes a stirring member. One end of the stirring member is provided on the fixed base or the bottom of the pot, and the other end of the stirring member extends towards the opening of the pot along the inner wall of the pot body. The stirring member is capable of moving relative to the pot scraping member in the circumferential direction of the pot body. There is a gap between the stirring member and the inner wall of the pot body, so as to cause the pot scraping member to pass through the gap. There is a gap between the stirring member and the pot scraping member. The stirring member includes a rigid section and a flexible section. The rigid section and the flexible section extend in a length direction of the stirring member. The rigid section is located on a side of the flexible section that is close to the central axis of the pot body.

In some embodiments, a fixed base is provided at the bottom of the pot. The pot further includes a stirring member. One end of the stirring member is provided on the fixed base or the bottom of the pot, and the other end of the stirring member extends towards the opening of the pot along the inner wall of the pot body. The stirring member includes a rod member and a tooth-shaped structure. The rod member extends in a radial direction of the inner wall of the pot body. The tooth-shaped structure protrudes from the rod member. The tooth-shaped structure is disposed on a side of the rod member that is close to a center of the pot body, or the tooth-shaped structure is disposed on a side of the rod member that is away from a center of the pot body, or the tooth-shaped structures are respectively disposed on two sides of the rod member. The stirring member further includes a bump. The bump is disposed on a end of the rod member that is close to an opening of the pot body. A width of the bump is greater than a width of the tooth-shaped structure.

The cooking device provided in the disclosure includes the frame, the base, the pot assembly, the first seasoning mechanism and the second seasoning mechanism. The base is connected to the frame; the pot in the pot assembly is connected to the base; the first seasoning mechanism and the second seasoning mechanism both are disposed on the frame; and the first seasoning mechanism is capable of quantifying the solid materials, so as to convey the solid materials into the pot, and the second seasoning mechanism is capable of quantifying the liquid materials, so as to convey the liquid materials into the pot. In this way, in the process that a user uses the cooking device for cooking, the solid materials and the liquid materials are respectively put into the pot by using the first seasoning mechanism and the second seasoning mechanism instead of manual material feeding. Therefore, the problems in the related art of long cooking time during the using of an automatic cooking machine by a user and poor user experience are solved, thereby improving user experience.

Figure 1:
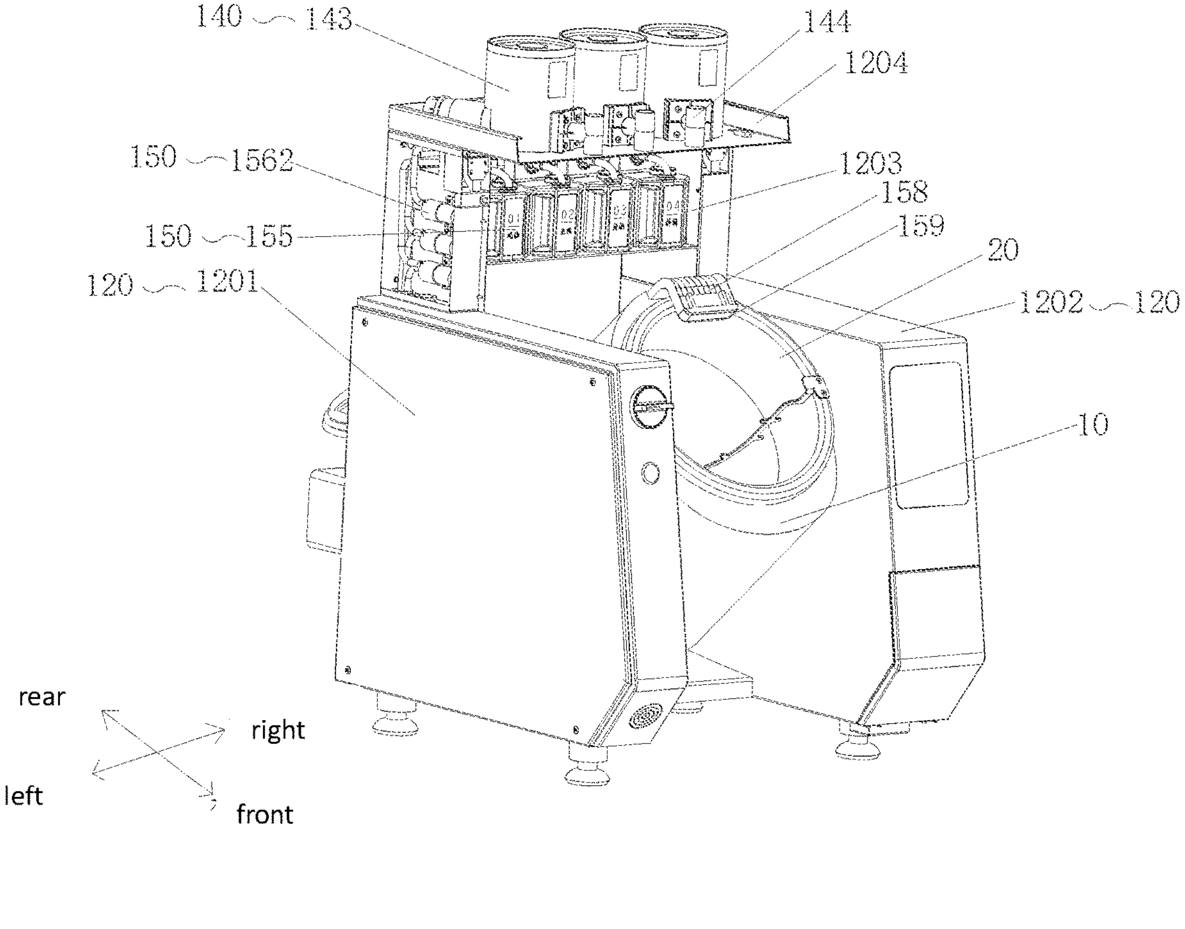
FIG. 1 is a schematic structural diagram of a cooking device according to a first embodiment of the disclosure.

A corresponding relationship among drawing signs in FIG. 1 to FIG. 24 and component names is shown as follows.

10. Base; 20. Pot; 30. Rotary shaft; 40. Driving mechanism; 50. Stabilization assembly; 51. First stabilization structure; 52. Second stabilization structure; 120. Frame; 1201. First accommodating cavity; 1202. Second accommodating cavity; 1203. Third accommodating cavity; 1204. Fourth accommodating cavity; 140. First seasoning mechanism; 143. First seasoning box; 144. Discharging cylinder; 150. Second seasoning mechanism; 151. First mounting structure; 1511. Protruding post; 1512. First stop plate; 152. Second mounting structure; 1521. Limit base; 153. First joint; 1533. Limit hole; 1534. Lug; 154. Second joint; 155. Second seasoning box; 1562. Pump body; 157. Second pipeline; 158. Nozzle assembly; 159. Nozzle; 100. Pump; 110. Housing; 111. Accommodating cavity; 112. Inlet; 113. Outlet; 1200. Impeller; 121. Blade; 130. Driving portion; 1400. Pump body; 1403. Raised structure; 1500. Support; 1501. First mounting hole; 160. End cover; 220. Fixing plate; 230. Funnel seasoning bin; 231. First port; 232. Second port; 240. Discharging tube; 250. Pressure relief apparatus; 260. Feeding tube; 310. Base body; 311. Guiding portion; 312. Fixing frame; 320. First seasoning storage portion; 350. Second seasoning storage portion; 360. Telescoping tube; 1. Pot body; 2. Pot scraping member; 21. Framework; 211. Pressing piece; 212. First end; 213. Second end; 22. Outer cover; 3. Fixed base; 4. Fixing member; 41. Limit column; 42. Elastic member; 5. Stirring member; 511. Tooth-shaped structure; 513. Rod member; 512. Bulge; 514. Bump.

DETAILED DESCRIPTION OF THE EMBODIMENTS

In order to enable a clearer understanding of the above objectives, features and advantages of the disclosure, the disclosure is further described in detail below with reference to the accompanying drawings and specific implementations. It is to be noted that the embodiments in the disclosure and the features in the embodiments may be combined with one another without conflict.

While many specific details are set forth in the following description to facilitate a full understanding of the disclosure, the disclosure may also be implemented in other manners different from those described herein, and therefore the scope of protection of the disclosure is not limited by the specific embodiments disclosed below.

A cooking device provided in some embodiments of the disclosure is described below with reference to FIG. 1 to FIG. 3. For cooking devices in the related art, such as automatic cooking machines, during frying of food materials, seasoning is usually placed on a cooking bench or in a cabinet, the space of the cooking bench is occupied, causing the cooking bench in a mess, and in addition, a user needs to take and place the seasoning by himself/herself according to needs, resulting in long cooking time by the user, and poor user experience.

In view of this, the disclosure provides a cooking device, which includes: a frame 120; a base 10, connected to the frame 120; a pot assembly, including a pot 20, the pot 20 being configured to be connected to the base 10; a first seasoning mechanism 140, disposed on the frame 120, the first seasoning mechanism 140 being capable of conveying solid materials into the pot 20; and a second seasoning mechanism 150, disposed on the frame 120, the second seasoning mechanism 150 being capable of conveying liquid materials into the pot 20.

The cooking device provided in an embodiment of the disclosure is shown in FIG. 1 and includes the frame 120, the base 10, the pot assembly, the first seasoning mechanism 140, and the second seasoning mechanism 150. The base 10 is connected to the frame 120; the pot 20 in the pot assembly is connected to the base 10; the first seasoning mechanism 140 and the second seasoning mechanism 150 both are disposed on the frame 120; and the first seasoning mechanism 140 is capable of quantifying the solid materials, so as to convey the solid materials into the pot 20, and the second seasoning mechanism 150 is capable of quantifying the liquid materials, so as to convey the liquid materials into the pot 20. In this way, in the process that a user uses the cooking device for cooking, the solid materials and the liquid materials are respectively put into the pot 20 by using the first seasoning mechanism 140 and the second seasoning mechanism 150 instead of manual material feeding. Therefore, the problems in the related art of long cooking time during the using of an automatic cooking machine by a user and poor user experience are solved, thereby improving user experience.

Figure 2:
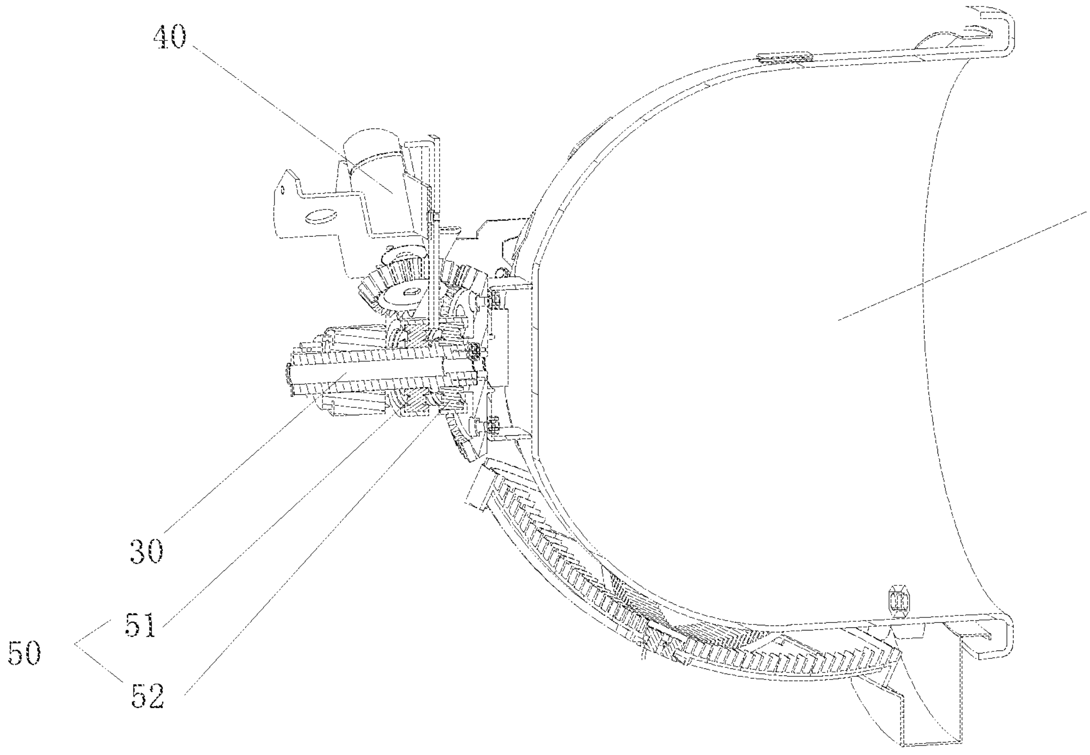
FIG. 2 is a cross-sectional view of a pot of the cooking device according to the embodiment shown in FIG. 1 after assembly.

In some embodiments of the disclosure, as shown in FIG. 2, the pot 20 is pivotally connected to the base 10. Specifically, a rotary shaft 30 is disposed at the bottom of the pot 20; and the rotary shaft 30 rotates relative to the base 10. The cooking device further includes a driving mechanism 40 and a stabilization assembly 50. The driving mechanism 40 provides rotational power to drive the rotary shaft 30 to rotate, so as to drive the pot 20 to rotate. The stabilization assembly 50 is disposed on the base 10; and the stabilization assembly 50 includes at least two stabilization structures sleeving outside the rotary shaft 30. Specifically, it is understandable that, the at least two stabilization structures are designed as ring mechanisms, so as to conveniently sleeve on the outside of the rotary shaft 30; and after sleeving, a gap between the inner side of a ring and the rotary shaft 30 is as small as possible, even tightly holding the rotary shaft 30, so as to better achieve the effect of stabilizing the rotary shaft, thereby reducing the shaking amplitude of the rotary shaft 30 during rotation. At least two stabilization structures are respectively disposed at different positions of the rotary shaft 30, are disposed tightly close to each other, or are separately disposed at intervals. Through such arrangement, in a process that the rotary shaft drives the pot to rotate, the at least two stabilization structures may support the rotary shaft within a larger axial range, so as to achieve a stabilization effect, such that an upper part of the pot is prevented from eccentrically rotating due to a long distance from the rotary shaft when the rotary shaft is relatively long and the height of the pot is relatively high, affecting a cooking effect. Therefore, the technical problem in the related art of easy shaking of the pot 20 during rotation is solved.

Compared with the arrangement of one stabilization structure, arranging a plurality of stabilization structures in this embodiment may play a role of stabilizing the rotary shaft 30 in a larger length and range, so as to reduce the shaking amplitude of the pot 20 during rotation, thereby improving the performance of the cooking device.

In an embodiment, there are two stabilization structures, the two stabilization structures are respectively a first stabilization structure 51 and a second stabilization structure 52, are arranged, sleeved on the rotary shaft 30 in sequence, and arranged at intervals in a length direction of the rotary shaft 30. The first stabilization structure 51 and the second stabilization structure 52 are in a ring shape or ring structures having openings, and providing the openings on the ring structures make operations more convenient and easier when the stabilization structures are sleeved on the rotary shaft. It is to be noted that, the number of the stabilization structures is not limited herein, and is adjusted according to actual situations.

Further, as shown in FIG. 1, the frame 120 of the cooking device is distributed on left and right sides and an upper rear side of the pot 20. A first accommodating cavity 1201 is provided in the frame 120 on the left side of the pot; and a second accommodating cavity 1202 is provided in the frame 120 on the right side of the pot. A water starch seasoning module (not shown in the figure) is provided in the second accommodating cavity 1202. The water starch seasoning module is configured to supply water starch into the pot 20 during cooking. The water starch seasoning module includes a water starch holding container and a water starch conveying assembly (which is integrally arranged in a first pipeline and a second pipeline 157 below). The water starch conveying assembly is configured to extract the water starch in the water starch holding container and convey and put the water starch into the pot 20. During cooking, when the water starch needs to be put, the water starch is put into the pot 20 by opening the water starch conveying assembly, such that automatic feeding is realized, and the quantification of the water starch is realized by means of pump extraction, thereby avoiding inaccurate and tedious quantification during manual feeding, and improving user cooking experience.

Specifically, starch is prone to precipitation due to long time standing of the water starch, such that a stirring assembly is provided in the water starch holding container, so as to stir the water starch in real time during cooking. Therefore, blocking of pipelines during pump extraction and quantification is avoided, and the problem of inaccurate quantification caused by starch precipitation is avoided.

Specifically, the water starch seasoning module is disposed in the second accommodating cavity 1202 of the frame 120 instead of being disposed outside the frame. Such arrangement may have the advantage of preventing impurities such as oil fume and dust during cooking from entering the water starch holding container to pollute the water starch, and also improving overall aesthetic degree of the cooking device. It is understandable that, disposing the water starch seasoning module in the frame 120 here mainly refers to disposing the water starch holding container in the frame 120. A pump pumps the water starch into the pot 20, and the water starch conveying assembly also needs to cooperatively convey the water starch into the pot. The water starch conveying assembly is disposed outside the frame; and the tail end of a conveying pipeline, for example, a nozzle structure, is provided on the edge of an opening of the pot, so as to accurately put the water starch into the pot to avoid scattering.

As shown in FIG. 1, the first accommodating cavity 1201 is provided in the left side of the frame 120; and the first accommodating cavity 1201 is provided with a water module (not shown in the figure), which is configured to supply water into the pot 20. It is understandable that, the water module includes a water pipeline. One end of the water pipeline is connected to a tap water pipeline, and the other end of the water pipeline is connected to a water conveying assembly, so as to put water into the pot 20. The water conveying assembly is integrally disposed on the first pipeline and the second pipeline 157 below.

Figure 3:
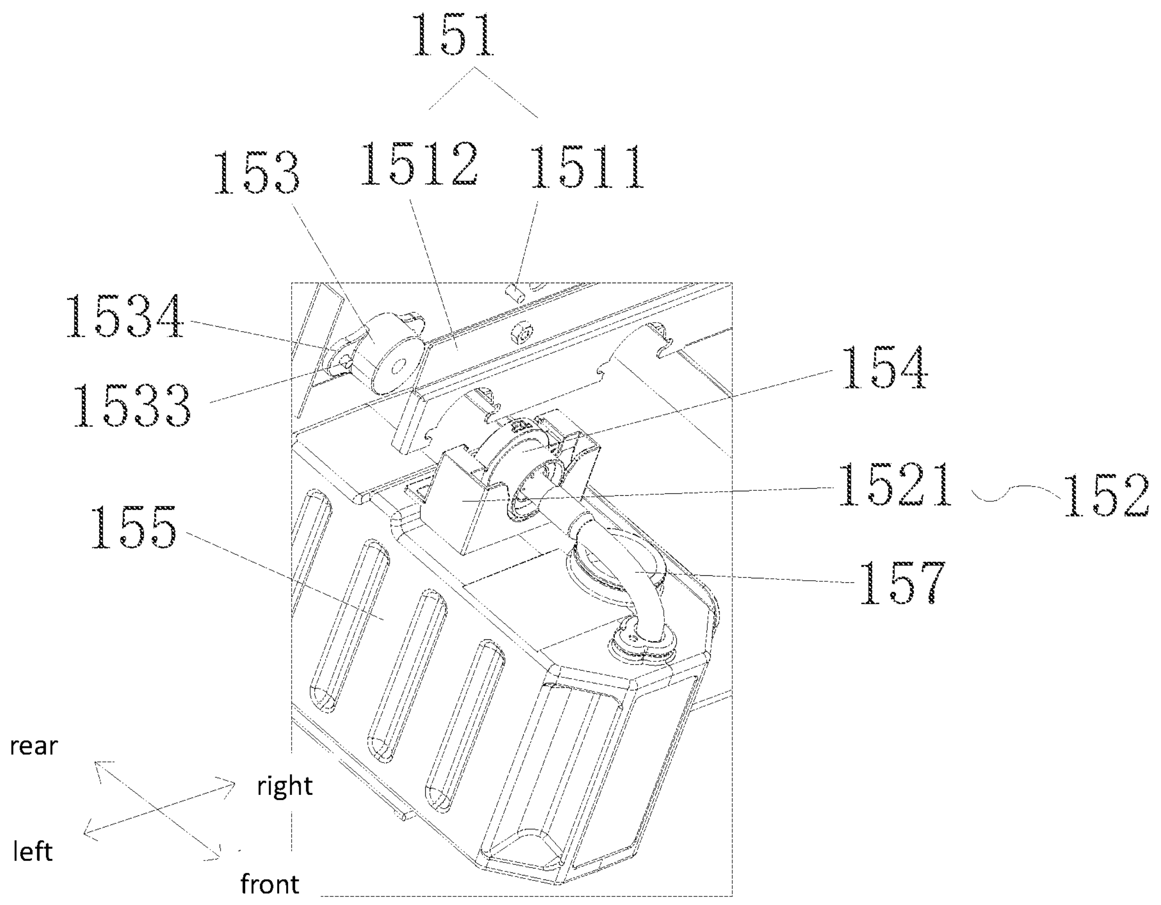
FIG. 3 is a partial enlarged view of a second seasoning mechanism of a cooking device according to an embodiment of the disclosure.

As shown in FIG. 1 and FIG. 3, the cooking device further includes a second seasoning mechanism 150, which is disposed on the frame 120, and specifically, is at least partially disposed in a third accommodating cavity 1203. The third accommodating cavity 1203 is located on the upper rear side of the pot. The second seasoning mechanism 150 includes a second seasoning box 155 and a conveying member (which is a pump body 1562 below), and is configured to convey liquid materials in the second seasoning box 155 into the pot 20 by means of the pump body 1562. The second seasoning mechanism 150 is entirely located in the third accommodating cavity, or is partially located in the first accommodating cavity. For example, the conveying pipeline and/or pump body of the conveying member are disposed in the third accommodating cavity 1203, so as to better achieve nice and clean appearance. The cooking device further includes a first seasoning mechanism 140. The first seasoning mechanism 140 is disposed on the frame 120 and at least partially located in a fourth accommodating cavity 1204. The first seasoning mechanism 140 includes a first seasoning box 143 and a conveying portion, and is configured to convey solid materials in the first seasoning box 143 into the pot 20 by means of the conveying portion. Specifically, the conveying portion is disposed in the fourth accommodating cavity 1204, and communicates with the first seasoning box. A discharging port is provided at the lower part of the conveying portion. The discharging port is opposite to the pot at a feeding station, so as to feed materials into the pot 20. The first seasoning box 143 is partially disposed in the third accommodating cavity 1203. As shown in FIG. 1, the first seasoning box 143 partially protrudes out of the fourth accommodating cavity 1204. Such arrangement may improve overall aesthetics, and may also make a user timely observe remaining seasoning by means of a transparent bottle of the first seasoning box 143, so as to timely replenish the seasoning when there is a small amount of seasoning left; and dust and oil fume may be prevented from entering the conveying portion, which needs to be cleaned from time to time, by disposing the conveying portion of the first seasoning mechanism 140 in the fourth accommodating cavity 1204. In an embodiment, the first seasoning mechanism 140 and the second seasoning mechanism 150 have quantification functions, such that automatic quantitative feeding are realized, so as to guarantee the taste of dishes. At the same time, in an embodiment, the first seasoning mechanism 140 and the second seasoning mechanism 150 are integrated with the conveying portion, so as to convey the quantified seasoning into the pot 20. Alternatively, seasoning is conveyed into the pot 20 in other forms without including the conveying portion. For example, the first seasoning mechanism 140 and the second seasoning mechanism 150 quantify the seasoning to a material-receiving cup or a spoon, and then the user takes the material-receiving cup or the spoon to put the seasoning into the pot 20. In this way, during the cooking of the cooking device, automatic feeding of the solid materials, the liquid materials, the water, and the water starch is realized by means of the first seasoning mechanism 140, the second seasoning mechanism 150, the water module, and the water starch seasoning module, such that automatic cooking of the cooking device is realized. In some embodiments of the disclosure, in a front-rear direction of the cooking device, the first seasoning mechanism 140 and the second seasoning mechanism 150 are located on a rear side of the pot assembly. Through such arrangement, two material supply modules of the solid materials and the liquid materials are located on the rear side of the cooking device, such that convenient operation of the user is realized without masking. Further, in a height direction of the cooking device, the second seasoning mechanism 150 is located between (which refers to the position of a main body portion of the second seasoning mechanism 150, the main body portion mainly refers to the second seasoning box 155 and the pump body 1562 of the second seasoning mechanism 150, or may also include a first joint 153 and a second joint 154 below, but a pipeline of the second seasoning mechanism 150 involved below where the seasoning is put into the pot and the position of a nozzle 159 are not limited herein) the first seasoning mechanism 140 and the pot assembly. In a horizontal direction, the first seasoning mechanism 140 is disposed above the pot 20 in a protruding manner relative to the second seasoning mechanism 150. Through such arrangement, the solid materials are put more smoothly and easily. In addition, such arrangement makes the structural layout of the cooking device more rational and compact.

In some embodiments of the disclosure, as shown in FIG. 1, the first seasoning mechanism 140 includes at least one feeding device. The feeding device is at least partially disposed in the fourth accommodating cavity 1204 of the frame 120, and is configured to supply the solid materials. The feeding device includes the first seasoning box 143 and the conveying portion. The conveying portion includes a support portion, a feeding tube, and a discharging cylinder 144. The discharging cylinder 144 includes a discharging port located above the pot 20. In the horizontal direction, the discharging port is disposed protruding towards a front side of the cooking device. In the height direction of the cooking device, the discharging port is located between the first seasoning mechanism 140 and the pot assembly. Through such arrangement, the solid materials may fall into the pot 20 via the discharging port under the action of gravity, such that the structure is simple, and the operation is convenient. In an embodiment, a baffle plate is provided at the lower part of the discharging port, so as to cover the discharging port. The baffle plate is moved to cover the discharging port when discharging is not required, so as to prevent bugs or dust from entering; and the baffle plate is then moved to not cover the discharging port when discharging is required, so as to input the materials into the pot 20. The baffle plate is designed to be moved manually or automatically; a control structure is used to control opening and closing when the baffle plate is automatically moved; and opening is realized when feeding is required or cooking is required, and closing is realized after feeding or cooking is completed. The pot 20 is designed to be turnable. Specifically, the left and right sides of the pot 20 are provided with turning shafts (not shown). The pot 20 achieves a turned connection with the left and right sides of the frame 120 by means of the turning shafts. When a dish is poured, the pot 20 turns a larger angle relative to a vertical direction, so as to cause an opening of the pot to face downward to pour the cooked dish; the pot 20 turns a relatively small angle relative to the vertical direction during cooking, so as to cause the pot 20 to have a certain inclination degree; and in this case, the dish is well spread at a junction between the bottom of the pot and the wall of the pot, facilitating the heating of the dish. When the seasoning needs to be put, the pot 20 turns to a position where a plane where the opening of the pot 20 is located is parallel to a horizontal plane; and in this case, the opening of the pot 20 is straight upwards (the feeding station), such that solid seasoning falls into the pot 20 via the discharging port under gravity, so as to be prevented from scattering to the outside of the pot 20. In an embodiment, the solid seasoning falls into the pot 20 via the discharging port under gravity; and for liquid seasoning, a feeding port is provided on the edge of the pot 20, for example, the nozzle structure. In this way, the pot 20 may not turn to the feeding station when the liquid seasoning is put, that is, the liquid seasoning is put in any cooking state, thereby improving user experience.

It is understandable that, in order to make the solid materials fall into the pot 20 at the feeding station under the action of gravity, the discharging ports of all the feeding devices are all required to be right above the opening of the pot 20 at the feeding station. The projections of all the discharging ports on the horizontal plane are within the range of the opening of the pot 20 at the feeding station. However, the environment of a kitchen is complex, and there are devices such as a kitchen hood, such that the solid materials tend to deviate from the vertical direction during falling off under gravity, resulting in scattering. In order to further prevent the solid materials from scattering to the outside of the pot 20 during feeding, the projections of all the discharging ports in the horizontal plane are designed in a center region. The center region is a circular or non-circular region that is less than the opening of the pot 20. Specifically, the center region is located in the center of a region of the opening of the pot 20 at the feeding station, and a ratio of an area of the center region to an area of the opening of the pot 20 is less than 3/4. That is to say, when the center region is circular, since the discharging port is right above the pot, the center region is a projection of a circle, which is formed at a certain radius by using the center of the opening of the pot 20 as the center of the circle, on the horizontal plane when the pot 20 is at the feeding station; and the ratio of an area of the circle to an area of the opening of the pot 20 is less than 3/4. Therefore, the upper and lower relative arrangement of the discharging port and the center region may cause the discharging port to be within the center region of the opening of the pot 20 when the pot 20 is at the feeding station, such that materials do not scanner to the outside of the pot 20 even if it is affected by certain external forces, thereby guaranteeing the stability of the materials fed into the pot, and the reducibility of cooking tastes.

In an embodiment, a ratio relationship between a first radius and the radius of the opening of the pot 20 is determined according to actual situations, so as to meet requirements of different heights of the first seasoning mechanism 140 and different shapes and sizes of the opening of the pot 20.

In some embodiments of the disclosure, as shown in FIG. 1, each of the at least one feeding device includes the first seasoning box 143 and the conveying portion. One end of the conveying portion communicates with the first seasoning box 143, and the other end of the conveying portion communicates with the pot 20. The conveying portion includes the support portion, the feeding tube, and the discharging cylinder 144. The first seasoning box 143 is configured to store the solid materials, and is at least partially disposed in the fourth accommodating cavity 1204 of the frame 120. One end of the feeding tube penetrates a support portion and communicates with the first seasoning box 143, and the other end of the feeding tube communicates with the discharging cylinder 144. The support portion is fixed on the first seasoning box 143, and is provided with a through hole for the feeding tube to pass through; and the discharging cylinder 144 is provided with the discharging port. In an embodiment, a discharging mechanism is disposed in the feeding tube, so as to convey the solid materials to the discharging cylinder 144, such that the solid materials are scattered into the pot 20 along the discharging port under the action of gravity, so as to realize feeding.

Specifically, the discharging mechanism in the feeding tube is a discharging screw rod, and the discharging screw rod is disposed at the bottom of the first seasoning box 143 and extends into the feeding tube; and the solid materials fall into a discharging screw region from the first seasoning box 143 during discharging, and are quantitatively pushed to the discharging port by the discharging screw rod, so as to fall into the pot 20 under the action of gravity.

In some embodiments of the disclosure, as shown in FIG. 1, a seasoning falling position of the first seasoning mechanism 140 is within a second range; the seasoning falling position is a position that the seasoning falls, from the discharging port under gravity, on the horizontal plane where the opening of the pot 20 is located when the pot 20 is at the feeding station; and the second range is a region smaller than the center region, is a circular region, or is a non-circular region. For example, when the second range is the circular region, the second range is the circular region that uses, as the center of a circle, the center of the opening of the pot when the pot 20 is at the feeding station and uses the other radius as a radius. That is to say, the second range and the center region are concentric circles, and the radius of the second range is less than the radius of the center region, that is, the second range is closer to a center point of the pot 20 at the feeding station than the center region, and the area is less than that of the center region. A discharging direction of the first seasoning mechanism 140 refers to the projection of a connection line between the center point of the first seasoning box 143 and the center point of the discharging port on the horizontal plane, that is, a projection direction of the feeding tube on the horizontal plane. By disposing the discharging direction of the first seasoning mechanism 140 to face towards the second range, the discharging port may approach towards the center of the pot 20 at the feeding station as much as possible when the first seasoning box 143 is arranged in a straight or arc manner, so as to further avoid the scattering of the seasoning. It is to be noted that, when the discharging cylinder 144 is disposed in the vertical direction, the seasoning directly falls into the pot via the discharging port, a discharging path of the seasoning into the pot 20 is always straight downwards, and in this case, the second range is completely equal to the center region. However, when the discharging cylinder 144 is disposed in a non-vertical direction, the path of the seasoning falling from the discharging port is inclined relative to the vertical direction during falling, and in this case, when the seasoning reaches the horizontal plane where the opening of the pot at the feeding station is located, the position of the seasoning is not in the same place as the projection of the discharging port on the horizontal plane, resulting in changes in a falling range of the seasoning. According to different orientations of the discharging port (that is, the discharging cylinder 144 is vertically disposed or obliquely disposed), the second range is greater than the center region, or the second range is less than the center region, or the second range is equal to the center region.

In an embodiment, as shown in FIG. 1, the at least two feeding devices are distributed in an arc shape rather than in a straight line. It is understandable that, the plurality of feeding devices are distributed in an arc shape, and an opening of an arc faces towards the side where the pot is located, that is, the feeding devices located at two ends of the arc are disposed farther ahead relative to the feeding device located in a center of the arc. It is understandable that, when the plurality of feeding devices are distributed in an arc shape, the discharging ports corresponding to the feeding devices are not necessarily distributed in an arc shape; and the orientations of the feeding tubes are set to be the same or different.

In an embodiment, when there are a plurality of feeding devices, the discharging ports only is designed to be distributed in an arc shape; adjustment is integrally performed by means of the positions of the feeding devices and the orientations of the feeding tubes, so as to cause the discharging ports to be distributed in an arc shape; and an opening of the arc faces towards the side where the pot is located, that is, the discharging ports located at the two ends of the arc are disposed farther ahead relative to the discharging port located in the center of the arc.

In an embodiment, when the plurality of feeding devices are distributed in an arc shape, the discharging ports corresponding to the feeding devices and the first seasoning box 143 are correspondingly distributed in an arc shape; and the orientations of the feeding tubes are set to be symmetrically distributed along a preset plane. Specifically, the preset plane refers to a vertical plane that passes through the center points of the plurality of feeding devices in a left-right direction and extends in a front-rear direction.

By designing the plurality of feeding devices to be distributed in an arc shape or designing the plurality of discharging ports to be distributed in an arc shape, and designing the orientations of the feeding tubes to be symmetrically distributed, an occupation space of the feeding devices in a width direction is reduced, facilitating the miniaturization of the cooking device; and the seasoning is prevented from scattering during feeding by making the discharging ports approach the center of the pot as close as possible.

In an embodiment, the discharging cylinder 144 is a bottom-to-top structure, that is, an opening on a lower end of the cylinder forms the discharging port, and an upper end is also provided with an opening communicating with the discharging port. Through such arrangement, the discharging cylinder 144 may not be burst when the seasoning blocks the discharging port, the blocked seasoning is squeezed out from the opening on the upper end of the discharging cylinder 144, and a user conveniently dredges the opening on the upper end of the discharging cylinder 144 by using tools.

In some embodiments of the disclosure, as shown in FIG. 1 and FIG. 3, the second seasoning mechanism 150 includes a first mounting structure 151, a first joint 153, a second seasoning box 155, a second mounting structure 152, and a second joint 154. The first mounting structure 151 is disposed on the frame 120 and provided with a first activity region. The first joint 153 is movably mounted in the first activity region, that is, the second joint 154 has a certain flexibly moving space in the second mounting structure 152, and is not completely limited. The first joint 153 communicates with one end of the first pipeline, and the other end of the first pipeline adapts to communicate with the pot 20. The second seasoning box 155 is disposed on the frame 120 and configured to accommodate the liquid materials. The second mounting structure 152 is disposed on the second seasoning box 155, and is provided with a second activity region. The second joint 154 is movably mounted in the second activity region, that is, the second joint 154 has a certain flexibly moving space in the second mounting structure 152, and is not completely limited. The second joint 154 communicates with the second seasoning box 155 by means of the second pipeline 157. Through such arrangement, in a process that the first joint 153 communicates with the second joint 154, both the first joint and the second joint may flexibly adjust self-positions to a certain extent according to each other's position, such that the first joint 153 and the second joint 154 are accurately abut against each other without leaving a gap, thereby avoiding material leakage. In addition, greater processing errors are allowed during processing, and the processing errors such as the inclination of the joints at a butt-joint position are offset by means of the active degrees of freedom of the first joint 153 and/or the second joint 154.

Specifically, in the height direction of the cooking device, the first mounting structure 151 and the second mounting structure 152 are located between the first seasoning mechanism 140 and the second seasoning mechanism 150. That is to say, the positions of the first mounting structure 151 and the second mounting structure 152 are set above the second seasoning box 155, that is, between the two material supply modules. Through such arrangement, there is a larger distance between the first seasoning mechanism 140 and the second seasoning mechanism 150 in the height direction, such that the second seasoning box 155 is conveniently taken and placed, and touching with the first seasoning box 143 during taking and placing is prevented from affecting user experience. In addition, the first mounting structure 151 is fixedly disposed on the frame 120, and the second mounting structure 152 is fixedly disposed on the second seasoning box 155 and specifically fixedly disposed on a side surface of the second seasoning box 155, such that the first pipeline and the second pipeline 157 are rationally segmented, and the second pipeline 157 is movably fixed on the seasoning box with the second mounting structure 152 by means of the second joint 154. When the user takes the second seasoning box 155 to replenish the seasoning, the second pipeline 157 is taken with the second seasoning box 155, and at the same time, the first pipeline is left on the frame 120, such that disorderly falling of the pipelines when the second seasoning box 155 is taken off is avoided, and the mounting position of the second seasoning box 155 is kept clean and tidy.

Specifically, the first joint 153 is able to rotate, translate forward and backward, or move forward, backward, upward and downward unevenly on both sides in the first activity region under the limitation of a stop mechanism (a protruding post 1511 as described in the following embodiments), that is, the first joint 153 moves in the first activity region.

Meanwhile, the second joint 154 is able to rotate, translate forward and backward, or move arbitrarily in the second activity region under the limitation of a stop mechanism (a second stop plate as described in the following embodiments), that is, the second joint 154 moves in the second activity region.

Through the above arrangement, the first joint 153 moves in the first activity region, and at the same time, the second joint 154 moves in the second activity region. It is understandable that, a moving mode of the first joint 153 in the first activity region, and a moving mode and flexibly moving amplitude of the second joint 154 in the second activity region are not limited. The moving modes of the two joints are the same or different, and are not specifically limited in the disclosure.

In some embodiment, as shown in FIG. 3, the first mounting structure 151 includes a first stop portion and a second stop portion, which form the first activity region. The second stop portion includes at least two protruding posts 1511. The first joint 153 is provided with a limit hole 1533, and the limit hole 1533 is mated with the protruding post 1511 to achieve stopping. The protruding post 1511 penetrates the limit hole 1533. A hole size of the limit hole 1533 is set to be greater than a cross-sectional size of the protruding post 1511, such that there is a movable gap between the protruding post 1511 and an inner side edge of the limit hole 1533 when the protruding post 1511 penetrates the limit hole 1533, so as to cause the protruding post 1511 to freely move in the gap, and free activity may be free movement in the front-rear direction.

Further, two protruding posts 1511 are respectively located on left and right sides. In addition, correspondingly, the limit holes 1533 of the first joint 153 are also correspondingly provided on two sides. Definitely, according to adjustment of the size of the gap, uneven movement on the left and right sides in the front-rear direction is achieved, for example, the left side is moved forward a little more, and the right side is moved forward a little less. It is understandable that, the protruding posts 1511 on the two sides are designed with the same size or different sizes. After mounting, the movable gaps between the protruding posts 1511 on the two sides and the inner side edges of the limit holes 1533 are the same or different, and are not limited herein. In addition, free activity may be free movement in the left-right direction, or may be free movement in the front-rear direction. For example, as far as the movable gap allows, the first joint 153 is entirely moved with a certain distance to the left or the first joint 153 is entirely moved with a certain distance to the right. In addition, the free activity is in a manner of combining left-right movement and front-rear movement.

The first stop portion includes a first stop plate 1512. After the first joint 153 is sleeved on the protruding post 1511 by means of the limit hole 1533, a movable range of the first joint 153 in the front-rear direction is not limited. However, a limit mechanism in the front-rear direction needs to be disposed on the frame 120, so as to prevent the first joint 153 from detaching from the protruding post 1511 to fall off. In this case, the first stop plate 1512 limits the distance that the first joint 153 moves in the length direction of the protruding post 1511, that is, the front-rear movement of the first joint 153 is limited, so as to prevent the first joint from detaching from the protruding post 1511.

The limit hole 1533 corresponding to the protruding post is provided on the first joint 153, the protruding post 1511 is disposed on the frame, the first joint 153 is sleeved on the protruding post 1511 by means of the limit hole 1533, and the first stop plate 1512 is located between the first joint 153 and the second joint 154, such that when the first joint 153 is mounted on the frame 120, the first joint 153 has a certain mounting degree of freedom on the frame 120, so as to move in the front-rear direction, the left-right direction, or the up-down direction within a certain range. In addition, through the arrangement of the first stop plate 1512, the first joint 153 does not fall off from the frame 120, thereby improving the reliability of products.

The first joint 153 and the second joint 154 are configured to be in magnetic connection. Specifically, magnets are respectively disposed on the ends of the first joint 153 and the second joint 154 that are close to each other, and the magnetism of the magnets is opposite, so as to achieve the magnetic connection. Herein, a specific structure of the magnetic connection is not limited. Convenient dismounting and mounting are achieved by means of magnetic connection, thereby facilitating the operations of the user.

As shown in FIG. 3, the second mounting structure 152 is a limit base 1521, that is, the second joint 154 is mounted on the second seasoning box 155 by means of the limit base 1521. It is understandable that, the limit base 1521 is detachably connected to the second seasoning box 155. Disposing the limit base 1521 on the second seasoning box 155 facilitates the taking and placing of the second seasoning box 155, such that the user only needs to pull out the second seasoning box 155 when changing the seasoning or replenishing the seasoning. The second joint 154 is left in the limit base 1521 after being taken off and is connected to the second pipeline 157, such that the entire pipeline of the cooking device is rationally arranged to avoid a mess. The limit base 1521 is provided with an accommodating groove, the accommodating groove may accommodate the second joint 154, and there is a gap between the second joint 154 and the accommodating groove, such that the second joint 154 has a freely moving space in the accommodating groove, and the accommodating groove herein is the second activity region. Specifically, the accommodating groove is provided with an upper end opening, such that the second joint 154 is directly put into the accommodating groove from an upper end opening. Further, the accommodating groove is provided with a second stop plate in a rear side direction. The end of the second joint 154 that is close to the first joint is provided with a positioning bulge; and after the second joint 154 is put into the accommodating groove, the positioning bulge is blocked by the second stop plate, so as to prevent the second joint 154 from unboundedly moving in a backward direction. In an embodiment, a stop plate is provided in a front side direction of the accommodating groove, so as to prevent the second joint 154 from unboundedly moving in a forward direction. However, in this embodiment, since the second pipeline 157 is connected to a front side of the second joint 154, the second pipeline 157 prevents, to a certain extent, the second joint 154 from unboundedly moving towards a front side, such that only the second stop plate is provided on the side (rear side) of the accommodating groove that is close to the first joint 153.

Therefore, during mounting, the second joint 154 has a certain freely moving space in the accommodating groove, and the first joint 153 also has a certain moving space under the cooperation of the protruding post 1511 and the first stop plate 1512, such that the first joint 153 and the second joint 154 during mounting may slightly adjust self-positions according to each other's mounting condition or error condition, so as to cause the butt-joint of the first joint 153 and the second joint 154 to be tighter, thereby avoiding leakage of the liquid materials.

In this embodiment, the first stop plate 1512 is provided with an opening, and the number and position of the openings correspond to the first joints 153 on a one-to-one basis, such that a butt-joint portion of the first joint 153 is exposed to abut against the second joint 154. Meanwhile, an opening is provided in the middle of the second stop plate, to expose a butt-joint portion of the second joint 154, so as to complete magnetic connection with the first joint 153. Specifically, the first joint is also provided with two lugs 1534, which are respectively arranged on left and right sides. It is understandable that, the size of the butt-joint portion of the first joint 153 is less than the opening corresponding to the first stop plate 1512. The mounted lugs 1534 are in a plane parallel to the first stop plate 1512, and the maximum size is greater than the size of the opening corresponding to the first stop plate 1512. Herein, the maximum size of the lugs 1534 refers to a distance between the furthest ends of the two lugs 1534. Through such arrangement, the first joint 153 may be abut against the second joint 154, and butt-joint is not hindered due to a stop structure.

Further, the liquid materials include soy sauce, vinegar, light soy sauce, and water starch.

In some embodiments of the disclosure, as shown in FIG. 1 and FIG. 3, the second seasoning mechanism 150 further includes a pump body 1562. The pump body 1562 is disposed to the first pipeline and disposed in the third accommodating cavity 1203. The first pipeline communicates with the second pipeline 157 by means of the first joint 153 and the second joint 154. The first pipeline is provided with a first valve body, and the first valve body is disposed between the pump body 1562 and a nozzle assembly 158 and disposed close to the pump body 1562. The seasoning needs to be conveyed into the pot 20 via the first pipeline, such that the first pipeline is often longer. A feeding end of the first pipeline is connected to the nozzle assembly 158, and the nozzle assembly 158 is fixedly disposed on a base on the edge of the opening of the pot, such that the first pipeline turns with the turning of the pot 20 during cooking. For example, at a cooking station, the pot is in an inclined state by turning a smaller angle, and turns a larger angle to pour dishes after cooking is finished; and at the feeding station, the opening of the pot is straight upwards, and the first pipeline is flexibly moved by disposing the first valve body close to the pump body 1562, so as to avoid damages to the first valve body due to frequent moving of the first pipeline.

In some embodiments of the disclosure, the first valve body is a one-way valve. As shown in FIG. 3, one end of the second pipeline 157 stretches into the bottom of the second seasoning box 155, and the second pipeline 157 is provided with a second valve body. Preferably, the second valve body is a one-way valve, and is disposed on the end of the second pipeline 157 that stretches into the second seasoning box 155. The other end of the second pipeline 157 stretches out of the second seasoning box 155, and is connected to the second joint 154. The second joint 154 is connected to the first joint 153 in a magnetic manner. The first joint 153 is connected to one end of the first pipeline, and a tail end of the other end of the first pipeline is connected to a nozzle 159. The nozzle 159 is integrated on the nozzle assembly 158. The pump body 1562, the second seasoning box 155, the first joint 153, the second joint 154, and the second pipeline 157 are all arranged in the third accommodating cavity 1203; and the first pipeline extends toward the rear part of the pot 20 after being led out from the pump body, so as to be exposed from the rear side of the pot. In an embodiment, in order to improve the nice and tidy appearance of the cooking device, the first pipeline may also enter the first accommodating cavity 1201 after being led out from the pump body, that is, the portion of the first pipeline that is led out from the third accommodating cavity 1203 is provided in the first accommodating cavity 1201. In this way, the entire cooking device may be more beautiful, and the cleanliness of the first pipeline is kept. When discharging is required, the pump body 1562 is opened to quantitatively extract liquid. Under the suction of a pump, the liquid materials enter the nozzle 159 via the second valve body, the second pipeline 157, the second joint 154, the first joint 153, the pump body 1562, the first pipeline, and the first valve body, so as to be fed into the pot 20.

The first valve body and the second valve body both are designed as the one-way valves. In this embodiment, the first valve body and the second valve body may only be opened if the first valve body and the second valve body meet a certain pressure. The first valve body and the second valve body may only be opened in the forward direction when a liquid pressure is greater than a opening pressure of the first valve body and the second valve body, so as to allow the liquid materials to flow in a direction from the second seasoning box 155 to the nozzle 159; and the first valve body and the second valve body may not be opened in a reverse direction, such that the reflux of the liquid is prevented. When the second seasoning box 155 is taken off, the second pipeline 157 is separated from the first pipeline, and the liquid seasoning of the first pipeline is reversely blocked by the first valve body, such that, without an external force, even if the height of the first joint 153 at the end portion of the first pipeline is lower than that of the other end of the first pipeline, the liquid materials do not reversely flow out from the first joint 153 at the end portion of the first pipeline. In addition, the liquid seasoning is prevented from dripping from the nozzle 159 through the arrangement of the first valve body. The principle lies in that, when the second pipeline 157 and the first pipeline are in a separation state, the pump stops working, and the liquid seasoning remained at a pipeline section between the first valve body and the pump body 1562 is insufficient to open the first valve body, such that the liquid seasoning of the pipeline section between the first valve body and the nozzle 159 do not flow, so as to prevent the liquid seasoning from dripping from the nozzle 159, thereby avoiding the situation that there is an empty section in the first pipeline not filled with the seasoning caused by the dripping of the seasoning from the nozzle 159. When there is an empty section in the seasoning pipeline, that is, the seasoning is not completely filled in the pipeline, the second seasoning box 155 is put back again, and then it is still considered, when quantitative feeding is performed again, that the seasoning pipeline is filled with the seasoning. However, the seasoning pumped actually may only spray from the nozzle 159 by first filling the empty pipeline section, causing an actual discharging amount to be less than a demanded amount, resulting in poor cooking tastes. In this way, the arrangement of the first valve body may not only prevent the liquid seasoning from flowing in the pipeline to cause leakage, but also avoid a quantitative error when the second seasoning box 155 is put back again, such that accurate quantification are ensured, thereby guaranteeing cooking taste.

When the first pipeline is separated from the second pipeline 157 by taking off the second seasoning box 155, the reflux of the second pipeline 157 is limited by the second valve body, so as to prevent the liquid seasoning in the second pipeline 157 from flowing back into the second seasoning box 155, such that the liquid seasoning does not flow back into a seasoning bottle without an external force, thereby avoiding the empty section of the second pipeline 157 not filled with the seasoning. Similar to the above principle, the quantitative error when feeding is performed again after the second seasoning box 155 is put back is avoided, thereby guaranteeing accurate quantification.

In this embodiment, an opening pressure of the first valve body is greater than an opening pressure of the second valve body. During discharging, the pump body 1562 is opened. An opening pressure of the second valve body is first reached under the suction of the pump, so as to open the second valve body, such that the liquid materials flow into the second pipeline 157 via the second valve body and enter the pump body 1562; the pressure of an outlet end of the pump body 1562 that faces toward the first pipeline is greater than the pressure of an inlet end of the pump body 1562 that faces toward the second pipeline 157, the liquid materials flow from the pump body, then the pressure is increased, and the first valve body is opened after the opening pressure of the first valve body is reached, such that the liquid materials are sprayed into the pot 20 from the nozzle 159. On the contrary, if the opening pressure of the first valve body is less than or equal to the opening pressure of the second valve body, the first valve body is first opened after the pump body is opened, and in this case, the second valve body is not opened, such that the liquid materials in the first pipeline flow from the nozzle 159 without simultaneously extracting from the second seasoning box 155, thereby forming the empty section in the discharging pipeline, that is, the seasoning is not filled in the pipeline, resulting in inaccurate quantification of the seasoning. Specifically, an actual feeding amount is less than an amount required, resulting in poor cooking taste, such that the opening pressure of the first valve body is required to be greater than the opening pressure of the second valve body.

In some embodiments of the disclosure, as shown in FIG. 1 and FIG. 3, the pump body 1562 and the first valve body both are fixedly disposed on the frame 120. When the second seasoning box 155 performs replenishment, the second seasoning box 155 pulls outward, and the first joint 153 is separated from the second joint 154; and since the first joint 153 is movably connected to the frame 120 by means of the first mounting structure 151, the first pipeline is not pulled or twisted when the first joint 153 is separated from the second joint 154, thereby ensuring that the first pipeline is not damaged. The first joint 153 is detachably connected to the second joint 154, such that the seasoning box may conveniently perform replenishment.

In this embodiment, the first valve body is arranged closed to the pump body 1562. Specifically, the first valve body is arranged closed to the pump body 1562 relative to the nozzle 159. In this way, the first valve body is fixed on the frame 120, such that the first pipeline is prevented from pulling or twisting when the first valve body is hung in air, thereby guaranteeing the service life of the first pipeline. Definitely, the portion in the first pipeline from the nozzle 159 to the first valve body is longer than other pipelines, such that the nozzle 159 is conveniently arranged next to the pot 20, so as to allow the liquid materials to enter the cooking device. The first pipeline is arranged in the frame 120, or is arranged next to the pot in an exposing manner, which is not limited again.

As shown in FIG. 1, the height of a mounting position of the second seasoning box 155 is greater than the height of a mounting position of the nozzle 159. In this way, the arrangement of a liquid material conveying apparatus in this embodiment is more rational. In addition, since the first pipeline is provided with the first valve body, the liquid materials are also blocked by the first valve body even if there is a height difference between the second seasoning box 155 and the nozzle 159, such that a siphon dripping phenomenon does not occur at the nozzle 159, thereby guaranteeing discharging accuracy of the liquid materials.

At present, the feeding of sauce materials with large viscosity and/or including large particles is usually completed manually, resulting in tedious operations, thus reducing user cooking experience. In some embodiments of the disclosure, the second seasoning mechanism 150 are configured to feed sauces, such that the sauces are fed into the pot 20 via the second seasoning mechanism 150, thereby realizing automatic feeding of the sauces. The second seasoning mechanism 150 provided in some embodiments of the disclosure is described below with reference to FIG. 4 to FIG. 15.

When the second seasoning mechanism 150 is configured to feed sauces, the second seasoning mechanism 150 includes a pump 100 and a controller. The pump 100 includes: a housing 110, provided with an accommodating cavity 111, and an inlet 112 and an outlet 113, which communicate with the accommodating cavity 111; an impeller 1200, disposed in the accommodating cavity 111 and including blades 121; and a driving portion 130, connected to the impeller 1200 and configured to drive the impeller 1200 to rotate to cause the blades 121 to be in contact with an inner wall surface of the housing 110 to cause flexible deformation, so as to output the seasoning via the outlet 113 by passing through the inlet 112 and the accommodating cavity 111. The controller is connected to the driving portion 130, and configured to control a working state of the driving portion 130 to quantify the seasoning and output the seasoning.

Figure 4:
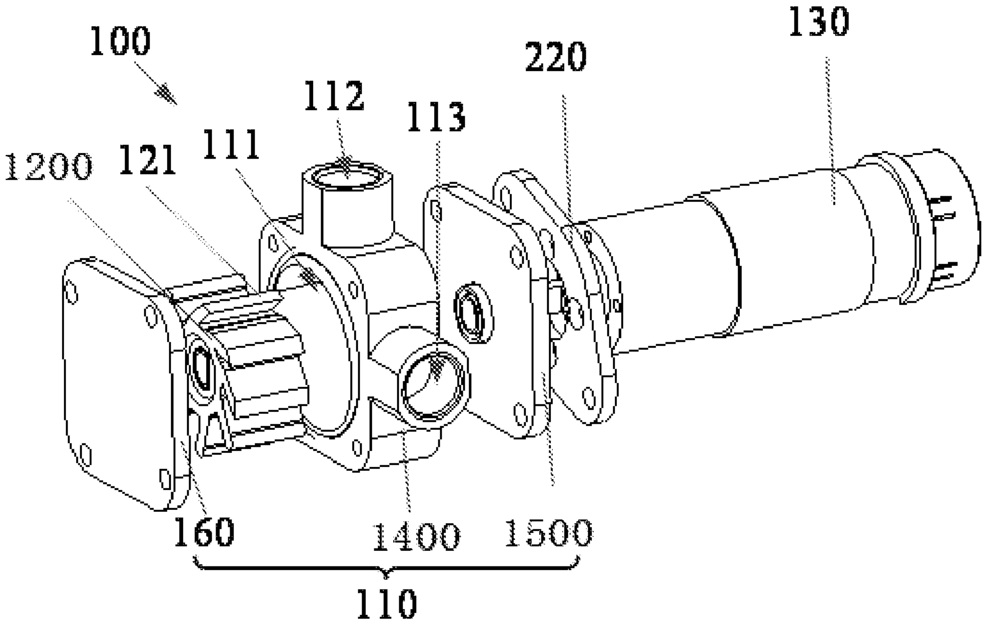
FIG. 4 is an exploded schematic diagram of a pump of a second seasoning mechanism according to a second embodiment of the disclosure.
Figure 5:
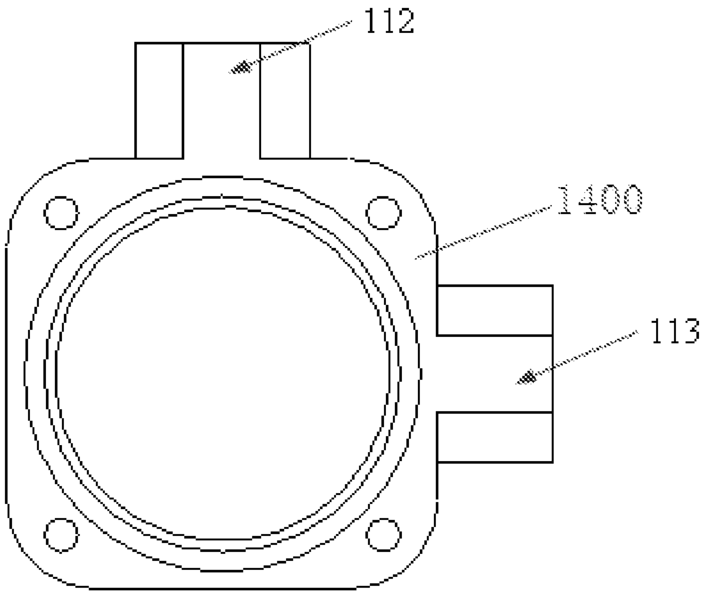
FIG. 5 is a schematic structural diagram of a pump body according to the embodiment shown in FIG. 4.
Figure 6:
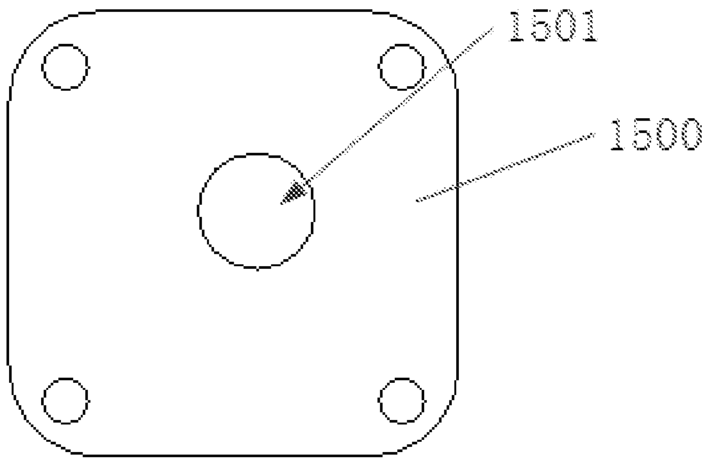
FIG. 6 is a schematic structural diagram of a support according to the embodiment shown in FIG. 4.
Figure 7:
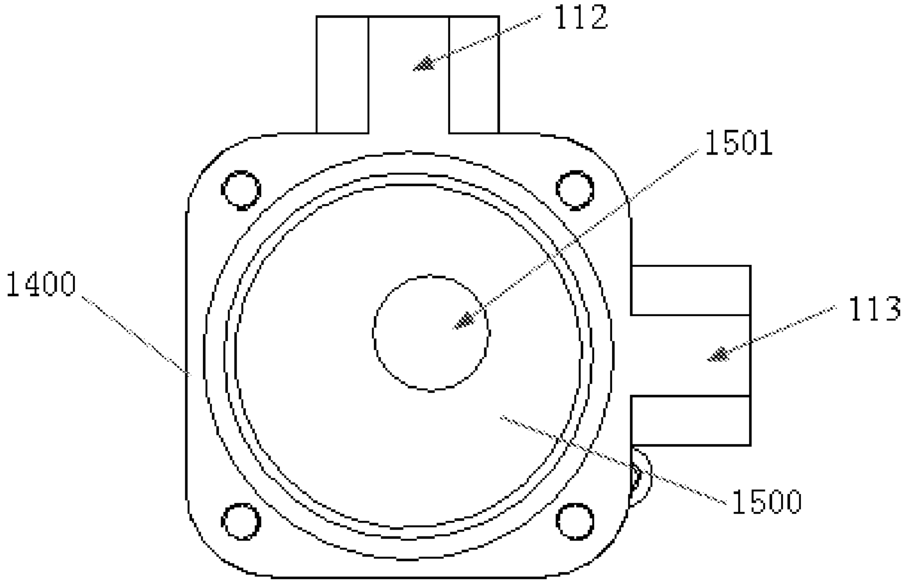
FIG. 7 is a schematic structural diagram of the pump body and the support according to the embodiment shown in FIG. 4 after assembly.
Figure 8:
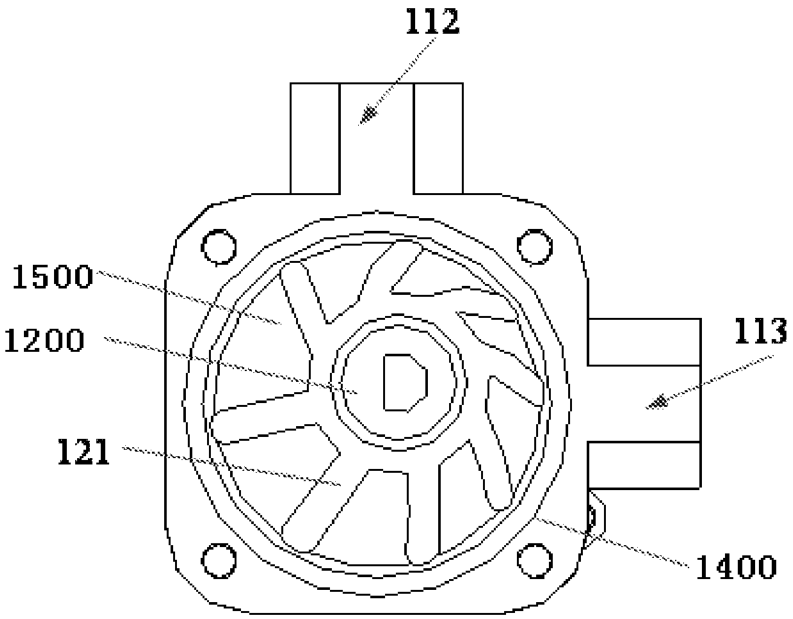
FIG. 8 is a schematic structural diagram of an impeller and the pump body according to the embodiment shown in FIG. 4 after assembly.
Figure 9:
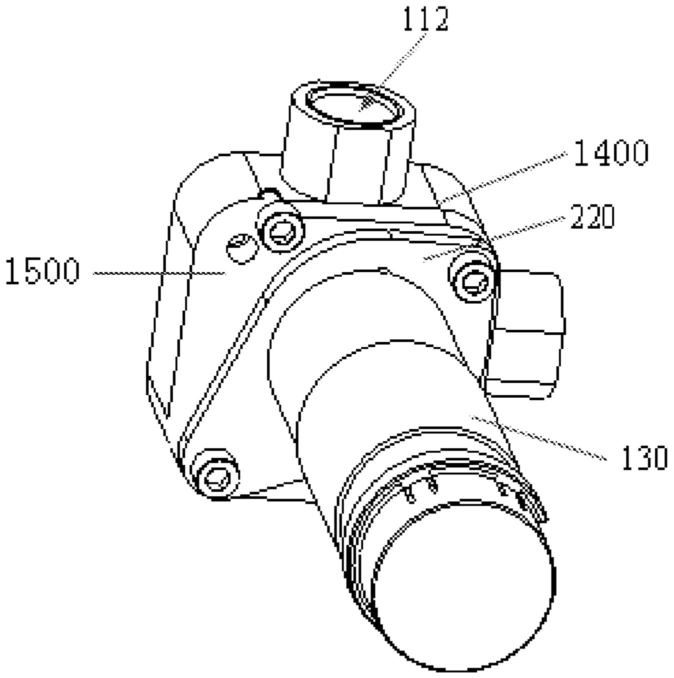
FIG. 9 is a schematic structural diagram of the pump from a viewing angle according to the embodiment shown in FIG. 4.
Figure 10:
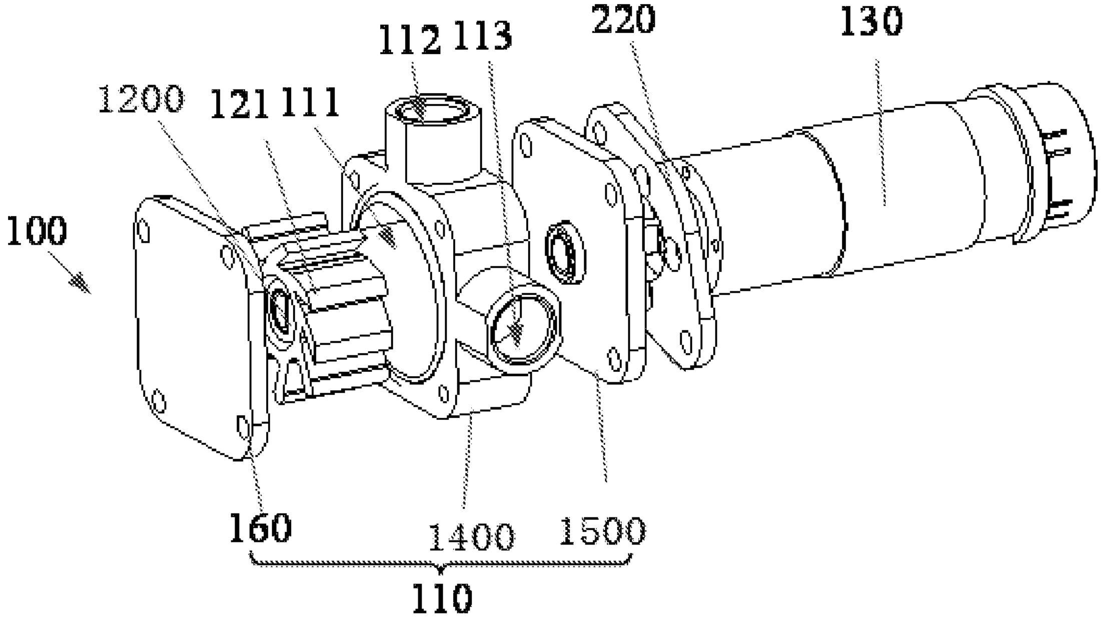
FIG. 10 is an exploded schematic diagram of a pump of a second seasoning mechanism according to a third embodiment of the disclosure.

The second seasoning mechanism 150 provided in the disclosure is shown in FIG. 4 and FIG. 10, and includes the pump 100 and the controller. The pump 100 includes the housing 110, the impeller 1200, and the driving portion 130. The housing 110 is provided with the accommodating cavity 111, and the inlet 112 and the outlet 113, which communicate with the accommodating cavity 111. The impeller 1200 is disposed in the accommodating cavity 111. The driving portion 130 is connected to the impeller 1200 and configured to drive the impeller 1200 to rotate. When the impeller 1200 rotates, the flexible deformation caused by the contact between the blades 121 of the impeller 1200 and the inner wall surface of the housing 110 may make the seasoning flow into the accommodating cavity 111 via the inlet 112, and output by the outlet 113. That is to say, the pump 100 provided in the embodiments of the disclosure is a flexible pump 100. During the working of the flexible pump 100, the capacity of the accommodating cavity 111 between the inlet 112 and the outlet 113 is changed by using flexible deformation of the blades 121, so as to provide large suction and conveying capabilities, such that the sauces (such as sauce seasoning) with large viscosity and/or including large particles are outputted by the outlet 113 via the inlet 112 under the action of the pump 100, thereby realizing automatic feeding, simplifying an operation of manual feeding, and improving user cooking experience. In addition, by connecting the controller and the driving portion 130, the controller controls a working state of the driving portion 130 to quantify the seasoning and output the same via the outlet 113. For example, the controller control a working duration of the driving portion 130 according to the discharging amount of the seasoning, such that the quantified seasoning is outputted via the outlet 113, the amount of the outputted seasoning matches a standard amount of a cookbook, and automatic quantitative output of the seasoning with large viscosity and/or large particles is realized, thereby further improving the automation of the second seasoning mechanism 150 and simplifying a step of the manual operation. In addition, the quantitatively outputted seasoning facilitates the improvement of the cooking quality of dishes, thereby improving the use satisfaction of the user.

Further, the driving portion 130 is a motor. After the second seasoning mechanism 150 receives a discharging instruction, the controller controls the motor to operate and drives the impeller 1200 to rotate; the flexible deformation caused by the contact between the blades 121 of the impeller 1200 and the inner wall surface of the housing 110 may form negative pressure suction at the inlet 112; during a process that the impeller 1200 continues to rotate to the outlet 113, the blades 121 are continuously compressed; and after reaching the outlet 113, the sauce seasoning is discharged out of the accommodating cavity 111 via the outlet 113, so as to realize discharging. The flexible deformation of the blades 121 may ensure that the pump 100 has large suction and conveying capabilities, such that the sauce seasoning with large viscosity and/or large particles are sucked via the inlet 112 and discharged by the outlet 113, so as to guarantee the feeding reliability of the sauce seasoning. Specifically, the motor is a direct-current motor. Compared with an alternating-current motor, the direct-current motor has the advantages of a small volume and a large moment, such that the requirement of a compact structure of the second seasoning mechanism 150 is met, and the requirement of a small volume of the second seasoning mechanism 150 is met, thereby enlarging a use range of products.

Specifically, the flexible deformation caused by the contact between the blades 121 and the inner wall surface of the housing 110 is implemented by means of an eccentric structure, or is implemented by means of other structures meeting the requirements, and the disclosure is not specifically limited thereto. It is understandable that, the portions of the blades 121 that are in contact with the inner wall surface of the housing 110 are elastic members, such that the blades 121 may bear against the inner wall surface of the housing 110 during rotation, so as to cause flexible deformation.

In some embodiments of the disclosure, as shown in FIG. 4 and FIG. 10, the housing 110 includes a pump body 1400, a support 1500, and an end cover 160. The inlet 112 and the outlet 113 are provided on the pump body 1400; the end cover 160 and the support 1500 are located on two sides of the pump body 1400 and form the accommodating cavity 111 with the pump body 1400; and the support 1500 is provided with a first mounting hole 1501, and the driving portion 130 penetrates the first mounting hole 1501 and is connected to the impeller 1200. For example, the motor includes a motor body and an output shaft, and the output shaft penetrates the first mounting hole 1501 and is connected to the impeller 1200. Further, the pump 100 further includes a fixing plate 220; the motor body is connected to the support 1500 by means of the fixing plate 220, that is, the output shaft is connected to the impeller 1200, and then fixed on the fixing plate 220 by means of the motor body; and the fixing plate 220 is connected to the support 1500, so as to reliably fix the motor on the housing 110.

On the one hand, as shown in FIG. 4, FIG. 5, FIG. 6, FIG. 7, FIG. 8 and FIG. 9, an inner wall surface of the pump body 1400 encloses a circular structure, and the first mounting hole 1501 is radially disposed eccentric with a center of the circular structure. Radial eccentricity is understood that, a plane where an opening of the circular structure that faces toward the side of the support 1500 is located is defined as a first plane, the projection of the center of the circular structure in the first plane is not overlapped with the projection of the first mounting hole 1501 in the first plane, there is a certain distance between the two projections, and the distance is an eccentric distance between the first mounting hole 1501 and the circular structure. That is to say, the inner wall surface of the pump body 1400 is a regular circular structure. The eccentric portion is moved onto the support 1500 by means of the first mounting hole 1501, such that the impeller 1200 connected to the driving portion 130 penetrating the first mounting hole 1501 is eccentrically arranged relative to the circular structure. In this way, in the process that the driving portion 130 drives the impeller 1200 to rotate, and in the process that the blades 121 of the eccentrically arranged impeller 1200 bear against the inner wall surface of the housing 110 of the circular structure, the capacity of the accommodating cavity 111 between the inlet 112 and the outlet 113 is continuously changed, so as to form negative pressure suction at the inlet 112 and improve the suction and conveying capabilities of the pump 100, such that the sauce seasoning is smoothly sucked into the accommodating cavity 111 via the inlet 112 and outputted via the outlet 113, thereby realizing the output discharging of the sauce seasoning with large viscosity. In addition, by designing the inner wall surface of the pump body 1400 as the circular structure, processing difficulty and processing cost of the pump body 1400 are reduced, such that the production efficiency of the pump 100 is improved, and manufacturing costs are reduced, thereby facilitating promotion and application.

Figure 11:
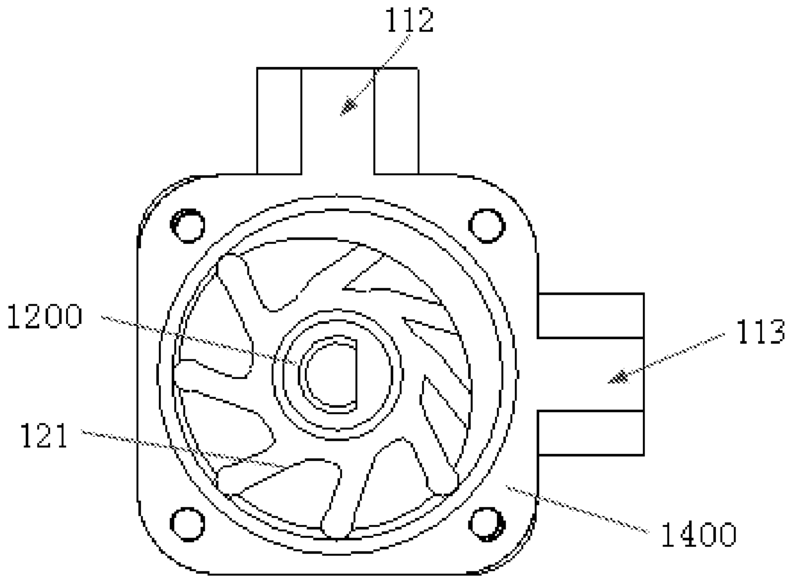
FIG. 11 is a schematic structural diagram of an impeller and a pump body according to the embodiment shown in FIG. 10 after assembly.
Figure 12:
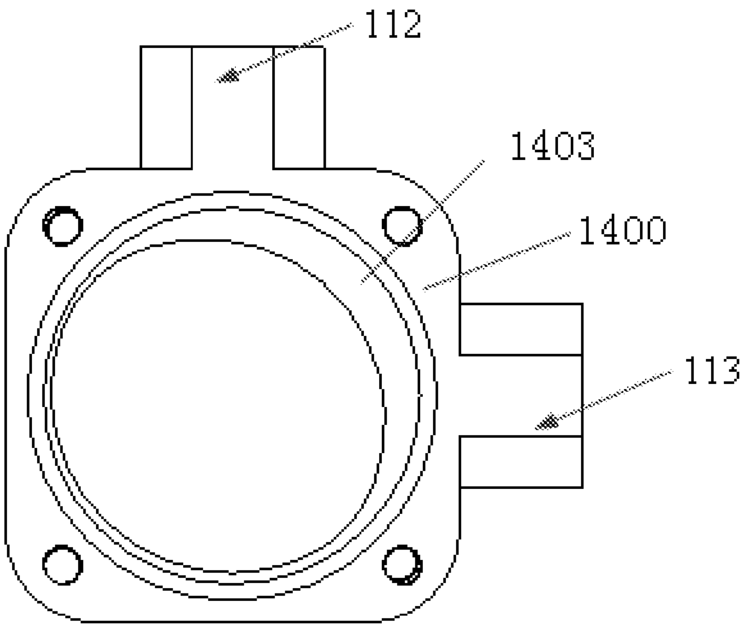
FIG. 12 is a schematic structural diagram of the pump body according to the embodiment shown in FIG. 10.

On the other aspect, as shown in FIG. 10, FIG. 11 and FIG. 12, the inner wall surface of the pump body 1400 encloses an eccentric structure; the first mounting hole 1501 is provided opposite to a center of the eccentric structure; an eccentric bump is provided in the circle where the inner wall surface is located; the eccentric bump is tangentially or integrally arranged with the inner wall surface of the circle, and covers a part of the inner wall surface of the original circle, such that the inner wall surface is of an eccentric structure. The first mounting hole 1501 being disposed opposite to the center of the eccentric structure means that the first mounting hole 1501 is disposed opposite to the center of the circle where the inner wall surface is located, that is to say, the impeller 1200 connected to the driving portion 130 penetrating the first mounting hole 1501 is concentrically disposed relative to the circle where the inner wall surface of the pump body 1400 is located. That is to say, in such structure, the eccentric portion is provided on the inner wall surface of the pump body 1400. In this way, in the process that the driving portion 130 drives the impeller 1200 to rotate, and in the process that the blades 121 of the impeller 1200 bear against the inner wall surface of the housing 110 of the eccentric structure, the capacity of the accommodating cavity 111 between the inlet 112 and the outlet 113 is continuously changed, so as to form negative pressure suction at the inlet 112 and output the seasoning at the outlet 113, thereby greatly improving the suction and conveying capabilities of the pump 100. Therefore, the sauce materials are smoothly and rapidly sucked into the accommodating cavity 111 via the inlet 112, and outputted via the outlet 113, thereby realizing the output discharging of the sauce seasoning with large viscosity.

On still another hand, the inner wall surface of the pump body 1400 encloses the eccentric structure, and the first mounting hole 1501 is radially disposed eccentric with the center of the eccentric structure. Radial eccentricity is understood that, a plane perpendicular to the rotary shaft of the impeller 1200 is defined as the first plane (which is a plane where the opening of the circular structure of the inner wall surface that faces toward the side of the support 1500 is located), the projection of the center of the eccentric structure in the first plane is not overlapped with the projection of the first mounting hole 1501 in the first plane, there is a certain distance between the two projections, and the distance is an eccentric distance between the first mounting hole 1501 and the eccentric structure. That is to say, the inner wall surface of the pump body 1400 is an irregular shape, which is the eccentric structure. The first mounting hole 1501 provided on the support 1500 is also eccentrically arranged relative to the center of the eccentric structure, that is, the impeller 1200 connected to the driving portion 130 penetrating the first mounting hole 1501 is eccentrically arranged relative to the eccentric structure. In this way, the inner wall surface of the pump body 1400, the impeller 1200 and the support 1500 jointly form two eccentric portions. In the process that the driving portion 130 drives the impeller 1200 to rotate, and in the process that the blades 121 of the eccentrically arranged impeller 1200 bear against the inner wall surface of the housing 110 of the eccentric structure, the capacity of the accommodating cavity 111 between the inlet 112 and the outlet 113 is continuously changed, so as to greatly improve the suction and conveying capabilities of the pump 100, such that the sauce materials are smoothly and rapidly sucked into the accommodating cavity 111 via the inlet 112 and outputted via the outlet 113, thereby realizing the output discharging of the sauce seasoning with large viscosity.

In the above embodiments, further, the eccentric structure includes an arc structure or at least two arc structures with different radii. The at least two arc structures with different radii are two arc structures, three arc structures, four arc structures, or other number of the arc structures meeting requirements. The eccentric structure formed by different numbers of the arc structures may meet requirements for different shapes of the inner wall surface of the housing 110, thereby enlarging a use range of products. For example, as shown in FIG. 12, a raised structure 1403 is provided on the inner wall surface of the housing 110 at the positions of the inlet 112 and the outlet 113. The raised structure 1403 is an arc structure. The arc raised structure 1403 encloses the eccentric structure with the inner wall surface of the housing 110 at other positions, such that the conveying capability of the pump 100 may be greatly improved. For another example, the inner wall surface of the housing 110 is provided with at least two arc structures, and the radii of curvature of the at least two arc structures are successively increased or decreased in a clockwise direction. For example, three arc structures are successively distributed on the inner wall surface of the housing 110; and the radii of the three arc structures are different and decreased in the clockwise direction, so as to cause the inner wall surface of the housing 110 to form the eccentric structure. The radius of curvature of the arc structure at the inlet 112 and the outlet 113 is the minimum, such that the capacity of the impeller 1200 during rotation is gradually changed, and more stable changing is achieved, thereby improving the suction and conveying capabilities of the pump 100. Specifically, during the rotation of the impeller 1200, the impeller 1200 is compressed at the eccentric structure. For example, the impeller 1200 is compressed at the arc structure with a small radius, such that the flexible pump 100 has a vacuum suction force, so as to ensure that the vacuum pump 100 has large suction and conveying capabilities, thereby guarantee the discharging reliability of the sauce seasoning.

Figure 13:
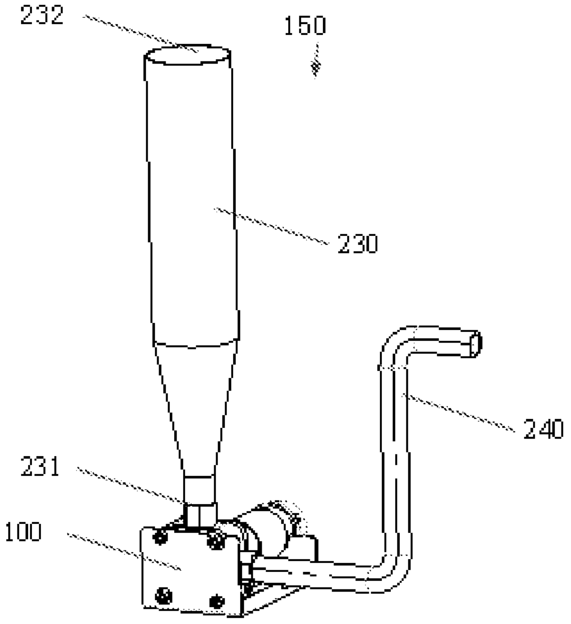
FIG. 13 is a schematic structural diagram of a second seasoning mechanism according to a first embodiment of the disclosure.

In some embodiments of the disclosure, as shown in FIG. 13, on the one hand, the second seasoning mechanism 150 further includes a funnel seasoning bin 230. The structure of the funnel seasoning bin 230 includes a first port 231 located at the bottom. It is understandable that, the funnel seasoning bin 230 further includes a second port 232 located above the first port 231, and an opening area of the second port 232 is greater than an opening area of the first port 231. Through the funnel seasoning bin 230 provided with the first port 231 and the second port 232, the sauce seasoning enters the funnel seasoning bin 230 via the second port 232, and then is rapidly outputted to the position of the first port 231 through the guidance of a funnel structure under the action of gravity, such that discharging efficiency is improved.

The first port 231 is in contact with and communicates with the inlet 112, that is, there is no pipeline communication between the funnel seasoning bin 230 and the inlet 112 of the pump body 1400, and the first port 231 directly communicates with the inlet 112, such that the sauce seasoning with large viscosity and/or large particles may smoothly and rapidly flow to the inlet 112 of the pump 100 by means of the guidance of the funnel seasoning bin 230, that is, the sauce materials with large viscosity and/or large particles are filled at the junction of the funnel seasoning bin 230 and the pump 100, such that the problems of insufficient suction of the pump 100 and inaccurate quantification or even unable discharging caused by the empty pipe section that is formed between the pump 100 and the seasoning bin by using a soft tube to connect the funnel seasoning bin 230 and the pump 100 are avoided, thereby improving the discharging efficiency and quantification accuracy of the sauce seasoning with large viscosity and/or large particles, improving cooking quality, and improving the use satisfaction of the user. It is understandable that, the funnel seasoning bin 230 is a circular funnel, a square funnel, an elliptical funnel, or a funnel with other shapes meeting requirements, and is not specifically limited in the disclosure.

Specifically, since the self-suction capability of the direct-current motor micro flexible pump 100 is relatively weak, if the seasoning bin is connected to the inlet 112 by means of a flexible feeding tube 260, there are problems of increased abrasion of the pump 100 and inability to discharging. For example, on one aspect, at the beginning of opening the flexible pump 100, there is no sauce seasoning in the accommodating cavity 111 of the pump 100 and on the feeding tube 260 and the discharging tube 240. When the pump is opened at a suction station, the driving portion 130 is large in opening power, small in suction and long in suction time, and the impeller 1200 is long in dry friction time, easily causing abrasion to the driving portion 130, the impeller 1200 and a control plate. On the other aspect, when the discharging tube 240 is longer, material shortage occurs at the feeding tube 260, and the discharging tube 240 does not discharge liquid, and when the flexible pump 100 starts to perform replenishment, due to the small self-suction force of the flexible pump 100 (the suction force when there is no medium in the pump 100 is about one fourth when the medium is filled in the pump 100, $P_{no\ medium}=0.25P_{medium}$), the flexible pump 100 after replenishment may not convey the sauce seasoning, and the feeding tube 260 may not discharge as well. And when the motor continues to rotate, the pressure in the pump 100 is also increased, easily causing leakage of the pump body 1400. Therefore, the first port 231 of the funnel seasoning bin 230 is in direct contact connection with the inlet 112 of the pump 100, for example, the first port 231 is connected to the inlet 112 of the pump 100 in a threaded manner, such that the arrangement of the feeding tube 260 is omitted, the sauce seasoning is timely replenished into the accommodating cavity 111 of the pump 100 under the action of gravity even if the pump 100 has no suction force, and the pump 100 operates under the working condition of media, that is, the pump 100 is guaranteed to operate under the working condition of a high suction force, a high head and no suction, thereby improving the suction and conveying capabilities of the pump 100, and improving discharging efficiency and discharging accuracy.

Figure 15:
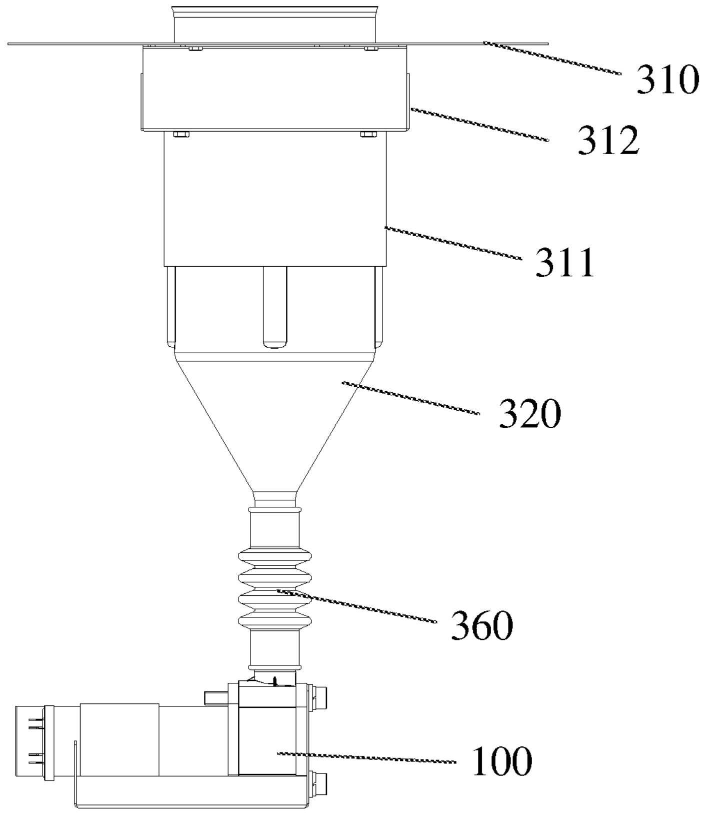
FIG. 15 is a partial schematic structural diagram of a second seasoning mechanism according to a third embodiment of the disclosure.

On the other hand, as shown in FIG. 15, the second seasoning mechanism 150 includes a first seasoning storage portion 320 and a telescoping tube 360; and the first seasoning storage portion 320 is disposed above the housing 110. It is understandable that, the first seasoning storage portion 320 is configured to accommodate the sauce seasoning with large viscosity and/or large particles. The telescoping tube 360 is a pipeline that may adjust the length of a flow path of the sauce seasoning. An upper end of the first seasoning storage portion 320 is provided with a seasoning replenishment port, and the other end of the first seasoning storage portion communicates with the inlet 112 by means of the telescoping tube 360. The first seasoning storage portion 320 is disposed above the housing 110, that is, the first seasoning storage portion 320, the telescoping tube 360 and the housing 110 are distributed from top to bottom in the vertical direction, such that the sauce seasoning in the first seasoning storage portion 320 has a tendency to flow downwards in a free state, so as to fill the telescoping tube 360. Therefore, when the pump 100 is used for material suction, the sauce seasoning in the first seasoning storage portion 320 may rapidly and smoothly enter the inlet 112 via the feeding tube, so as to complete a material suction action of the pump 100. By providing the seasoning replenishment port on an upper end of the first seasoning storage portion 320, material replenishment is rapidly performed by the seasoning replenishment port when the amount of the seasoning in the first seasoning storage portion 320 is insufficient, such that simple operations are achieved, and a material replenishment operation is simplified. The telescoping tube 360 is connected to the first seasoning storage portion 320 and the inlet 112, such that during the moving of the first seasoning storage portion 320, or when the pump 100 operates with large vibration, the telescoping tube 360 is still reliably connected to the first seasoning storage portion 320 and the inlet 112 of the pump 100, thereby improving the reliability of the second seasoning mechanism 150.

Figure 14:
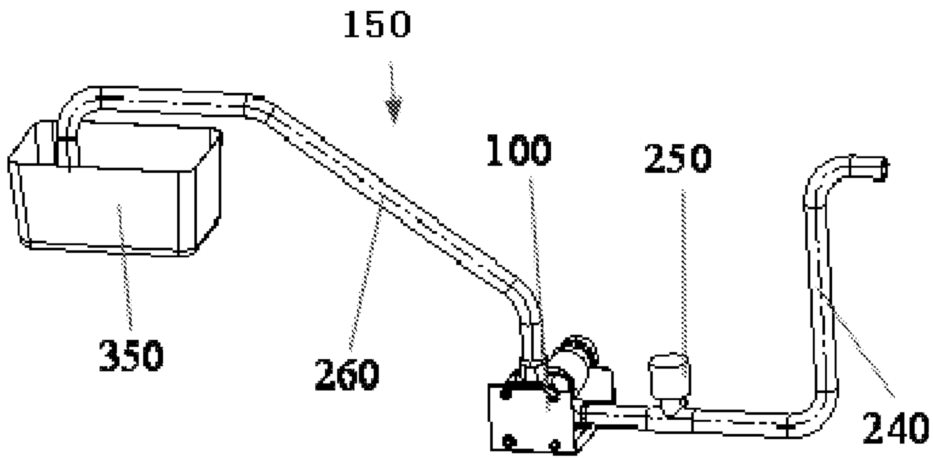
FIG. 14 is a schematic structural diagram of a second seasoning mechanism according to a second embodiment of the disclosure.

In some embodiments of the disclosure, as shown in FIG. 14, the second seasoning mechanism 150 further includes the discharging tube 240 and a pressure relief apparatus 250. The discharging tube 240 communicates with the outlet 113, that is, the second seasoning is outputted by the outlet 113 of the pump 100 and then conveyed to a specific position via the discharging tube 240, for example, conveyed into the pot. By disposing the pressure relief apparatus 250 communicating with the discharging tube 240 at the outlet 113 or disposing the pressure relief apparatus 250 on the discharging tube 240, the controller is connected to the pressure relief apparatus 250 and controls a working state of the pressure relief apparatus 250. During feeding, the controller controls the pressure relief apparatus 250 to operate, so as to timely exhaust high-pressure air in the accommodating cavity 111, thereby improving the vacuum suction force at the inlet 112 of the flexible pump 100, such that the second seasoning is guaranteed to smoothly and rapidly enter the accommodating cavity 111. When the sauce seasoning needs to be outputted via the outlet 113, the controller closes the pressure relief apparatus 250, such that the conveying capability of the pump 100 is improved, so as to convey the sauce into higher and farther pots. Specifically, a pressure sensor is mounted on the pressure relief apparatus 250. After the pressure of the outlet 113 end reaches a threshold of the pressure relief apparatus 250, the controller automatically opens the pressure relief apparatus 250; and after the pressure is reduced, the sensor feeds back a signal, and then the controller closes the pressure relief apparatus 250.

Specifically, the second seasoning mechanism 150 further includes the feeding tube 260 communicating with the inlet 112. The feeding tube 260 is a flexible tube. In the process that the flexible pump 100 uses the vacuum suction force to suck the sauce seasoning into the pump 100 and convey the same to the pot, the problems of high head and long-distance conveying may not be met. As under the working condition of material shortage, the sauce seasoning in the discharging tube 240 may not be drained. Due to the small self-suction force of the flexible pump 100 (the suction force when there is no medium in the pump 100 is about one fourth when the medium is filled in the pump 100, $P_{no\ medium}$=0.25P medium), the flexible pump 100 after replenishment may not convey the sauce, and in this case, the driving portion 130 continues to operate, the compressed air in the pump 100 may not be exhausted, and a suction tube may not perform feeding, such that discharging may not be performed normally. Therefore, by disposing the pressure relief apparatus 250 at the outlet 113 of the pump 100 or on the discharging tube 240, the pump body 1400 performs replenishment after material shortage. In this case, the pressure relief apparatus 250 is opened, high-pressure air is timely exhausted when the driving portion 130 rotates, so as to improve the vacuum suction force at the inlet 112 of the flexible pump 100, such that the sauce seasoning in the feeding tube 260 is normally inputted into the pump 100. When the sauce seasoning is conveyed to the pump body 1400 ($P_{no\ medium}$=0.25P medium), the pressure relief apparatus 250 is closed, such that a conveying distance of a sauce apparatus is increased, thereby enlarging a use range of products. Specifically, the pressure relief apparatus 250 are a ball valve, a solenoid valve, and a one-way valve or another structure meeting requirements.

In some embodiments of the disclosure, as shown in FIG. 14, the second seasoning mechanism 150 further includes a second seasoning storage portion 350. The second seasoning storage portion 350 is configured to store the sauce seasoning, for example, storing an oyster sauce, a thick broad-bean sauce, and a sweet sauce made of fermented flour. One end of the feeding tube 260 communicates with the inlet 112 or the funnel seasoning bin 230 of the second seasoning mechanism 150, and the other end of the first seasoning storage portion communicates with the second seasoning storage portion 350, so as to replenish materials for the second seasoning storage portion 350.

Further, the second seasoning mechanism 150 further includes the funnel seasoning bin 230, the discharging tube 240, and the pressure relief apparatus 250. The first port 231 of the funnel seasoning bin 230 that is located at the bottom is in contact connection with the inlet 112; and the pressure relief apparatus 250 is disposed at the outlet 113 or on the discharging tube 240. In this way, there is no pipeline communication between the funnel seasoning bin 230 and the inlet 112 of the pump body 1400, and the first port 231 directly communicates with the inlet 112, such that the sauce seasoning with large viscosity may smoothly and rapidly flow to the inlet 112 of the pump 100 by means of the guidance of the funnel seasoning bin 230, that is, the sauce materials with large viscosity are filled at the junction of the funnel seasoning bin 230 and the pump 100. In addition, through the arrangement of the pressure relief apparatus 250, when the pump 100 is used for replenishing the materials, the pressure relief apparatus 250 is opened to timely exhaust the high-pressure air in the accommodating cavity 111, so as to improve the vacuum suction force at the inlet 112 of the flexible pump 100, such that the sauce seasoning in the feeding tube 260 is rapidly and smoothly inputted into the accommodating cavity 111, thereby improving the reliability and fastness of discharging. That is to say, the first port 231 of the funnel seasoning bin 230 is in contact connection with the inlet 112, and through the arrangement of the pressure relief apparatus 250, double protection on material replenishment is performed, such that the pump 100 operates under the working condition of media, that is, the pump 100 is guaranteed to operate under the working condition of a high suction force, a high head and no suction, thereby improving the suction and conveying capabilities of the pump 100, and improving discharging efficiency and discharging accuracy. It is understandable that, when the sauce seasoning is conveyed to the pump body 1400 ($P_{no\ medium}$=0.25P medium), the pressure relief apparatus 250 is closed, such that a conveying distance of a sauce apparatus is increased, thereby enlarging a use range of products.

Further, as shown in FIG. 15, the second seasoning mechanism 150 further includes the first seasoning storage portion 320, the telescoping tube 360, the discharging tube 240, and the pressure relief apparatus 250. The first seasoning storage portion 320 is located above the housing 110, that is, the first seasoning storage portion 320, the telescoping tube 360, and the housing 110 of the pump 100 are arranged in the vertical direction, such that the sauce seasoning in the first seasoning storage portion 320 has a tendency to flow downwards in a free state, so as to fall into the telescoping tube 360; and the pressure relief apparatus 250 is disposed at the outlet 113 or on the discharging tube 240. In this way, when the pump 100 is used for replenishing the materials, the pressure relief apparatus 250 is opened to timely exhaust the high-pressure air in the accommodating cavity 111, so as to improve the vacuum suction force at the inlet 112 of the flexible pump 100, such that the sauce seasoning in the telescoping tube 360 is rapidly and smoothly inputted into the accommodating cavity 111, thereby improving the reliability and fastness of discharging. It is understandable that, when the sauce seasoning is conveyed to the pump body 1400 ($P_{no\ medium} \approx 0.25 P_{medium}$), the pressure relief apparatus 250 is closed, such that a conveying distance of a sauce apparatus is increased, thereby enlarging a use range of products.

Specifically, a base body 310 is provided with a guiding portion 311. The second seasoning mechanism 150 further includes a fixing frame 312. The fixing frame 312 is fixed on the base body 310; the guiding portion 311 is mounted on the fixing frame 312; and the first seasoning storage portion 320 penetrates the fixing frame 312 and is connected to the guiding portion 311, so as to cause the first seasoning storage portion 320 to slide along the guiding portion 311.

Further, the telescoping tube 360 and the discharging tube 240 are both required to have certain hardness. The telescoping tube 360 is prevented from deforming and flattening caused by the suction of the flexible pump 100 by guaranteeing the certain hardness; and the discharging tube 240 is prevented from deforming and thickening caused by a discharging pressure by guaranteeing the certain hardness, thereby ensuring discharging reliability. Through the arrangement of the telescoping tube 360, the length of the telescoping tube is adjustable, such that it is ensured that, during up and down moving of the first seasoning storage portion 320 along the guiding portion 311, the telescoping tube 360 is reliably connected to the first seasoning storage portion 320 and the inlet 112 of the pump 100 or reliably connected to the first seasoning storage portion 320 and the second port 232 of the funnel seasoning bin 230. It is understandable that, the telescoping tube 360 is in an S shape during mounting, so as to guarantee a reliable connection with other components during the sliding of the first seasoning storage portion 320 in the vertical direction.

Further, a first portion of the first seasoning storage portion 320 is provided with the seasoning replenishment port communicating with an external environment. For example, an upper end of the first portion is designed as an opening structure, and the opening structure forms the seasoning replenishment port. Further, the base body 310 is provided with a mounting port. The seasoning replenishment port is located at the mounting port, or the seasoning replenishment port communicates with the mounting port, and then a material replenishment apparatus is set to communicate with the first seasoning storage portion 320 at the mounting port for material replenishment. In this way, material replenishment is performed on the first seasoning storage portion 320 by means of the seasoning replenishment port, such that the convenient operation of the user is realized, and a tedious operation that the user takes the first seasoning storage portion 320 from the base body 310 to perform material replenishment is avoided, thereby simplifying the material replenishment operation of the user, and improving user experience.

In some embodiments of the disclosure, a pot scraping member is further disposed in the pot 20.

As shown in FIG. 16 to FIG. 24, In some embodiments of the disclosure, the pot 20 includes a pot body 1 and a pot scraping member 2; the pot scraping member 2 is provided on an inner wall of the pot body 1; the pot scraping member 2 is attached to the inner wall of the pot body 1; and the pot body 1 is capable of moving in a circumferential direction of the pot body 1 relative to the pot scraping member 2, so as to cause the pot scraping member 2 to scrape food materials attached to the inner wall of the pot body 1. Through the arrangement of the pot scraping member 2, when food materials easily sticking to the pot 20 are cooked, the food materials are scraped only by moving the pot body 1 relative to the pot scraping member 2 in a circumferential direction of the pot body 1, without manually using tools such as a spatula to spade the pot 20, such that the operation is simple and convenient, cooking efficiency is improved, and the intensity of manual labor is also reduced. In addition, when the pot 20 is washed, residues on the inner wall of the pot body 1 are scraped by using the pot scraping member 2, thereby further reducing the amount of manual labor, and improving working efficiency.

Further, the shape of the pot scraping member 2 is the same or similar to the shape of the inner wall bus of the pot body 1. By applying a pressure to the pot scraping member 2, the pot scraping member 2 is bent and deformed, such that the pot scraping member 2 is completely attached to the inner wall of the pot body 1.

Further, in this embodiment, the pot body 1 is a semi-circular pot body, that is, the pot body 1 is a hollow hemisphere. The bus of the inner wall of the pot body 1 is an arc, and the entire shape of the pot scraping member 2 is an arc shape corresponding to the bus of the inner wall of the pot body 1.

Further, the pot body 1 achieves relative displacement with the pot scraping member 2 in the circumferential direction of the pot body 1, such that the food materials attached to the inner wall of the pot body 1 are scraped. For example, the pot body 1 may rotate with its own central axis as the center of rotation, and the pot scraping member 2 remains still, or the pot scraping member 2 rotates in the circumferential direction of the pot body 1, and the pot body 1 remains still. Alternatively, the pot scraping member 2 and the pot body 1 both move in the circumferential direction of the pot body 1, but at different speeds or in opposite directions. In this embodiment, the pot body 1 may rotate with its own central axis as the center of rotation, such that automatic cooking is realized, and the pot scraping member 2 remains still.

Specifically, the end of the pot scraping member 2 that is close to the bottom of the pot 20 of the pot body 1 is rotatably connected to the bottom of the pot body 1, such that the end of the pot scraping member 2 that is close to the bottom of the pot 20 of the pot body 1 may be rotatably sleeved at the bottom of the pot 20 of the pot body 1, and an indirect rotary connection is realized by means of other devices, thereby achieving a rotation effect. When the pot body 1 rotates, the pot scraping member 2 stands still relative to the pot body 1, and the pot scraping member 2 scrapes the food materials adhered on the pot body 1 by applying a pressure with a certain angle to the pot scraping member 2. The end of the pot scraping member 2 that is close to the pot 20 of the pot body 1 is in limited connection with the pot body 1.

Further, there is at least one pot scraping member 2. When there are more than two pot scraping members 2, the pot scraping members 2 are uniformly arranged on the inner wall of the pot body 1 in the circumferential direction of the pot body 1, and the number is not limited in this embodiment. The number of the pot scraping members 2 is adjusted according to the size of the pot body 1, so as to scrape the food materials on the inner wall of the pot body 1, such that the phenomenon of unripe food materials or reduced taste of the food materials caused by the food materials sticking to the pot 20 is avoided. The central axis of the pot scraping members 2 and the central axis of the pot body 1 are located in the same plane. That is to say, the pot scraping members 2 reversely extends along any bus of the pot body 1, such that the effect of scraping the pot 20 is guaranteed, and the taste of the cooked food materials is ensured.

Further, the pot scraping member 2 includes a framework 21 and an outer cover 22; the outer cover 22 is sleeved on the framework 21; the framework 21 applies a pressure to the outer cover 22, so as to cause the outer cover 22 to be attached to the inner wall of the pot body 1; and the outer cover 22 is made of a flexible material.

Specifically, the framework 21 is a thin sheet metal component that is mildly flexible to bend, such that the framework is conveniently processed and formed, and is easy to bend; the bottom of the framework and the radian of the pot body 1 are fitted with each other, so as to scrape the inner wall of the pot body 1 without dead corners. The framework 21 plays a role in supporting the outer cover 22; and the framework 21 is slightly bent by applying a pressure with a certain angle to the framework 21, to drive the outer cover 22 to bend and completely fit with the inner wall of the pot body 1, so as to scrape the food materials attached to the inner wall of the pot body 1, such that food materials are prevented from sticking to the pot 20, and a function of automatically washing the pot 20 is realized. The framework 21 has a certain degree of rigidity, so as to provide scraping power for scraping the food materials or residues on the inner wall of the pot body 1, such that the food materials or residues on the inner wall of the pot body 1 are completely scraped. The rigidity of the framework 21 is increased by adding a reinforcing rib during processing, and is not limited in this embodiment.

The outer cover 22 is a flexible plastic member, preferably PTFE, or is a non-toxic, harmless, and high-temperature resistant material, which is not further limited in the disclosure. The PTFE is a polymer compound polymerized by tetrafluoroethylene, and has excellent chemical stability, corrosion resistance, high lubrication, non-viscosity, electrical insulation and good anti-aging endurance, and a working temperature of the PTFE may reach 250° C., such that the PTFE is an optimal choice of materials to be used in the disclosure. In addition, the PTFE is conveniently processed and manufactured. Through the action of the outer cover 22, the food materials on the inner wall of the pot body 1 are conveniently scraped, so as to be prevented from sticking to the pot 20, and the function of automatically washing the pot 20 is realized, such that a manual operation is avoided. The outer cover 22 scrapes food residues on the inner wall of the pot body 1, and reduces frictional noise between the pot body 1 and the pot scraping member 2 when the pot body 1 rotates.

In the disclosure, the outer cover 22 is in sleeving connection with the framework 21; the outer cover 22 is directly completely sleeved on the framework 21, so as to completely coat the framework 21 in an inner cavity of the outer cover 22; the outer cover 22 is sleeved on the sidewall of the framework 21; and a specific mounting mode is not further limited. When the framework 21 is bent, the outer cover 22 is simultaneously driven to bend, and it is ensured that the outer cover 22 and the framework 21 do not fall off, such that the outer cover 22 scrapes the food materials or residues on the inner wall of the pot body 1.

Further, the framework 21 includes a first end 212 and a second end 213. The pot body 1 includes the bottom of the pot 20 and the opening of the pot 20. The first end 212 is disposed at the bottom of the pot 20, and the second end 213 is disposed at the opening of the pot 20.

Specifically, by means of the first end 212 and the second end 213 of the framework 21, the distribution of the framework 21 from the bottom of the pot 20 of the pot body 1 to the opening of the pot 20 is implemented; and by guaranteeing the shape of the framework 21 to be the same as the radian of the pot body 1, it is ensured that the framework 21 is completely fitted with the inner wall of the pot body 1, such that the framework 21 drives the outer cover 22 to completely scrape the food materials on the inner wall of the pot body 1.

Further, the first end 212 is provided with an assembly port; a fixed base 3 is disposed at the bottom of the pot 20; and at least part of the fixed base 3 is disposed in the assembly port, so as to fix the first end 212.

Specifically, the shape of the assembly port at the first end 212 is a U shape or a circle, such that the first end 212 is conveniently rotatably connected to the fixed base 3. The rotary connection refers to sleeving the assembly port of the first end 212 on the fixed base 3, or inserting the assembly port of the first end 212 onto the fixed base 3. A specific mounting mode is not further limited. The effect of the disposed assembly port is to connect the first end 212 of the framework 21 and the fixed base 3, such that when the pot body 1 rotates, the framework 21 remains still, or when the framework 21 rotates, the pot body 1 remains still, thereby conveniently scraping the food materials on the inner wall of the pot body 1 by the framework 21.

The fixed base 3 is connected to the bottom of the pot 20 of the pot body 1 through welding or riveting, and a specific connection mode is not further limited. Therefore, it is ensured that the fixed base 3 may still be firmly connected to the pot body 1 when the pot body 1 rotates clockwise or anticlockwise. The fixed base 3 plays a role in supporting the framework 21, so as to stably support the framework 21 and increase overall support strength. The shape of the fixed base 3 is not further limited, is a sphere, or is a square, as long as a part of the fixed base 3 is rotatably connected to the assembly port of the first end 212.

Figure 16:
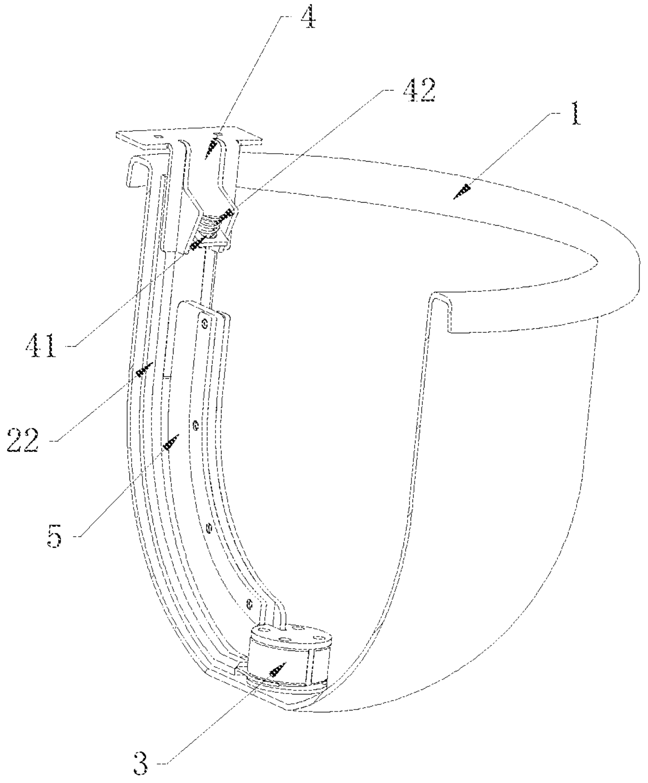
FIG. 16 is a three-dimensional cross-sectional view of a pot according to a first embodiment of the disclosure.
Figure 17:
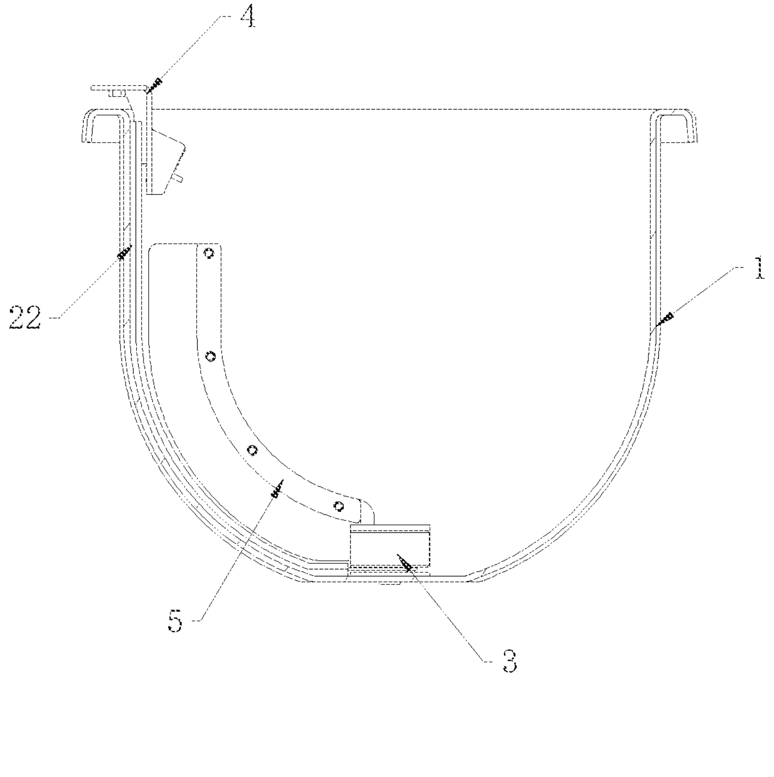
FIG. 17 is a view of one angle of the pot in FIG. 16 of the disclosure.
Figure 18:
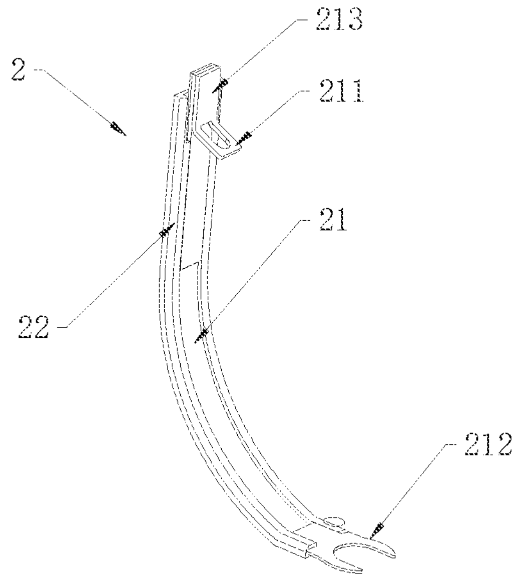
FIG. 18 is a schematic diagram of a three-dimensional structure of a pot scraping member in FIG. 16 of the disclosure.

As shown in FIG. 16 and FIG. 17, according to some embodiments of the disclosure, In an embodiment, the pot 20 further includes a fixing member 4. The fixing member 4 is connected to the second end 213, so as to limit the second end 213 in the circumferential direction of the pot body 1.

Specifically, through the arrangement of the fixing member 4, the support and limitation of the framework 21 are enhanced, and the support strength of the framework 21 is improved. The fixing member 4 is fixedly connected to an external device. The external device is a support on a cooking bench, or a support fixed with the ground. The external device is not further limited, as long as the fixing member 4 is fixedly supported. The fixing member 4 is movably connected to the second end 213. Through a clamping limit, the framework 21 is located between the fixing member 4 and the inner wall of the pot body 1, so as to support the second end 213 of the framework 21.

Further, the fixing member 4 is provided with a limit space, and the second end 213 is provided in the limit space. The fixing member 4 includes a limit column 41. The limit column 41 is located in the limit space. The second end 213 is provided with a pressing piece 211, and the pressing piece 211 is disposed on an outer wall of the second end 213 that is close to a central axis of the pot body 1. The pressing piece 211 is provided with a mating hole. The limit column 41 stretches into the mating hole. An elastic member 42 is sleeved on the limit column 41. The elastic member 42 applies, to the pressing piece 211, an elastic force towards the inner wall of the pot body 1, so as to cause the pot scraping member 2 to be attached to the inner wall of the pot body 1. By disposing the elastic member 42, a force towards the inner wall of the pot body 1 is applied to the pressing piece 211, so as to cause the framework 21 to be completely fitted with the inner wall of the pot body 1. The effect of the elastic member 42 is to apply forces to the pressing piece 211 at different angles, and the framework 21 is guaranteed to be always fitted with the pot body 1. Disposing the limit column 41 may limit the displacement of the elastic member 42, so as to guide the elastic member 42 and provide a deformation force to the framework 21, thereby scraping the food materials on the inner wall of the pot body 1.

Specifically, the fixing member 4 is hollow, so as to form the limit space internally. Two sides of the fixing member 4 in the circumferential direction of the pot body 1 both are provided with sidewalls, so as to limit the second end 213 of the framework 21, thereby preventing the second end 213 from separating from the limit space when the pot body 1 rotates. The fixing member 4 is openly disposed in a radial direction of the pot body 1, such that the framework 21 is fitted with the inner wall of the pot body 1, so as to scrape the food materials attached to the inner wall of the pot body 1.

The limit column 41 is fixedly mounted in the limit space located in the radial direction of the fixing member 4. The shape of the limit column 41 is cylindrical. A connection mode between the limit column 41 and the fixing member 4 is not further limited, as long as the limit column is firmly connected to the fixing member 4. The limit column 41 plays a role in guiding the elastic member 42, and the elastic member 42 accurately applies a pressure to the pressing piece 211.

The pressing piece 211 is connected to the second end 213 in a welding or riveting manner. Through the effect of the pressing piece 211, the elastic member 42 conveniently applies the pressure to the framework 21, causing the framework 21 to bend, so as to scrape the food materials attached to the inner wall of the pot body 1. The elastic member 42 is a spring or an elastic tube. The elastic member 42 is bent and deformed in the direction of the framework 21 facing towards the inner wall of the pot body 1, so as to cause the framework 21 to be fitted with the inner wall of the pot body 1.

Further, the pressing piece 211 protrudes from an outer wall of the second end in a first direction. The mating hole is in a strip shape, and extends in the first direction.

Specifically, through the strip-shaped mating hole, the elastic member 42 may apply the pressure to the pressing piece 211 by changing an angle under the guidance of the limit column 41, thereby improving an effect of better fitting the framework 21 and the inner wall of the pot body 1.

Further, a total distance, in a circumferential direction of the pot 20, between an inner wall of the mating hole and the limit column is A, the length of the mating hole in the circumferential direction of the pot 20 is B, and a ratio of A to B is 0-0.2.

A total distance, in the first direction, between the mating hole and the limit column is C, the length of the mating hole in the first direction is D, and a ratio of C to D is 0.3-0.9.

Specifically, according to the ratio of A to B being 0-0.2 and the ratio of C to D being 0.3-0.9, accurate limit between the limit column 41 and the mating hole is improved; and under the action of the elastic member 42, the limit column 41 achieves a more accurate guiding effect, thereby improving a fitting degree between the framework 21 and the inner wall of the pot body 1.

Further, a plane perpendicular to the central axis of the pot body 1 is a first plane; and the direction of the force applied to the pressing piece 211 by the elastic member 42 is at an angle A to the first plane, wherein $20° \le A \le 45°$.

Specifically, the pot scraping member 2 only is completely fitted with the inner wall of the pot body 1 by applying the pressure at an angle A being $20° \le A \le 45°$, such that according to different angles applying the pressure, the pot scraping member 2 completely scrapes the food materials attached to the inner wall of the pot body 1 by using the elastic member 42 of different elastic forces, thereby avoiding the phenomenon of sticking to the pot 20.

As shown in FIG. 16, according to some embodiments of the disclosure, in an embodiment, the pot 20 further includes a stirring member 5. One end of the stirring member 5 is provided on the fixed base 3 or the bottom of the pot 20, and the other end of the stirring member 5 extends towards the opening of the pot 20 along the inner wall of the pot body 1. The stirring member 5 moves in the circumferential direction of the pot body 1 relative to the pot scraping member 2. There is a gap between the stirring member 5 and the inner wall of the pot body 1, such that the pot scraping member 2 may pass through the gap. In an embodiment, there is a certain gap between the stirring member 5 and the pot scraping member 2, which specifically means that there is still a gap between the stirring member 5 and the pot scraping member 2 when the stirring member 5 and the pot scraping member 2 are in an overlapping state during rotation. The gap may cause the stirring member 5 to cross more easily over the pot scraping member 2, so as to avoid scratching. In addition, large pieces of food such as bones may also pass through the gap between the stirring member 5 and the pot scraping member 2 more easily during stirring.

Figure 20:
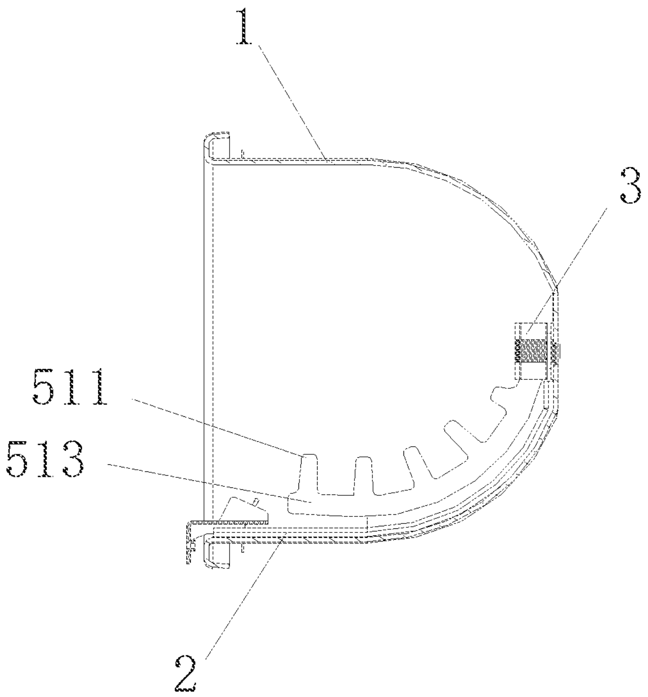
FIG. 20 is a cross-sectional view of a pot according to a third embodiment of the disclosure.
Figure 21:
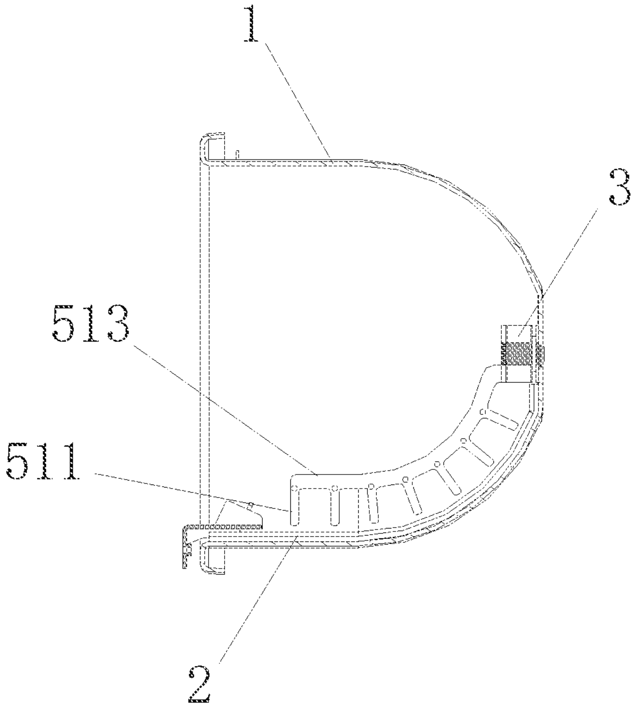
FIG. 21 is a cross-sectional view of a pot according to a fourth embodiment of the disclosure.
Figure 22:
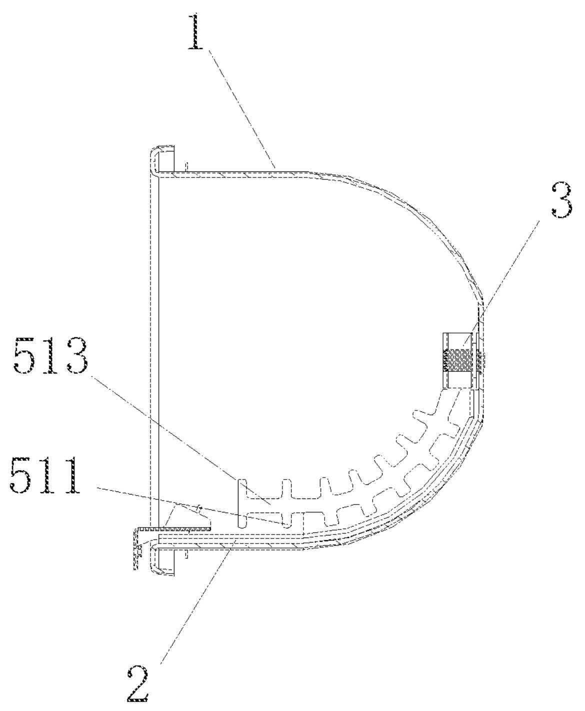
FIG. 22 is a cross-sectional view of a pot according to a fifth embodiment of the disclosure.
Figure 23:
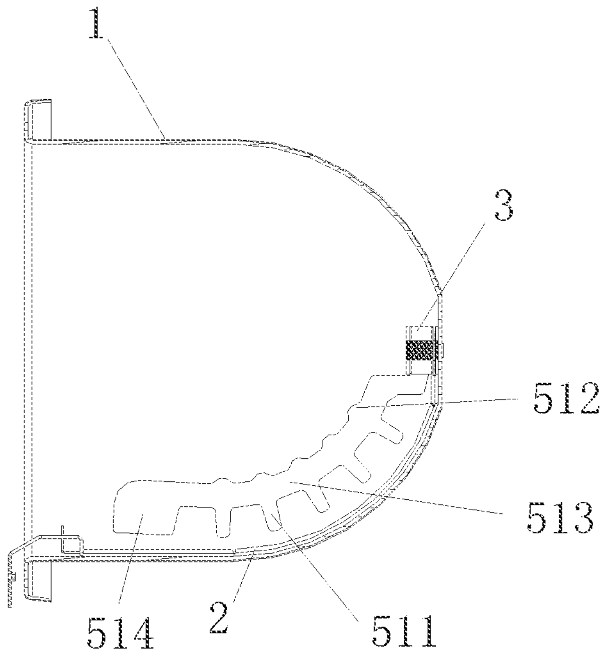
FIG. 23 is a cross-sectional view of a pot according to a sixth embodiment of the disclosure.

In an embodiment, as shown in FIG. 20 to FIG. 23, the stirring member 5 includes a rod member 513 and a tooth-shaped structure 511. The rod member 513 extends in a radial direction of the inner wall of the pot body; and a bending shape matches the inner wall of the pot body. The tooth-shaped structure 511 protrudes from the rod member 513. The rod member 513 and the tooth-shaped structure 511 are disposed integrally or separately. The stirring member may stir the food materials more sufficiently by disposing the tooth-shaped structure 511. A disposing position of the tooth-shaped structure 511 is not limited in the disclosure. For example, as shown in FIG. 20, the tooth-shaped structure 511 is disposed on the side of the rod member 513 that is close to the center of the pot body, such that the food materials close to the center of the pot body is stirred more sufficiently. As shown in FIG. 21, by disposing the tooth-shaped structure 511 on a side of the rod member 513 that is away from the center of the pot body, the effect of stirring the food materials more sufficiently is achieved, and hard objects are prevented from being stuck between the stirring member 5 and the pot scraping member 2 as far as possible. As shown in FIG. 22, the tooth-shaped structures 511 are respectively arranged on two sides of the rod member 513, such that the food materials close to the side of the pot body are fully stirred, and the hard objects are prevented from being stuck between the pot scraping member 2 and the stirring member 5 as far as possible. In an embodiment, as shown in FIG. 23, the stirring member 5 may further include a bulge 512. The bulge 512 and the tooth-shaped structure 511 are respectively arranged on two sides of the rod member 513. The bulge 512 is disposed on the side of the rod member 513 that is close to the center of the pot body. The bulge 512 and the tooth-shaped structure 511 have different lengths. In an embodiment, the length of the bulge 512 is less than the length of the tooth-shaped structure 511. If the length of the tooth-shaped structure on the side of the rod body that is close to the inner wall of the pot body is longer, the hard objects are prevented from being stuck between the pot scraping member 2 and the stirring member 5 as far as possible; and if the length of the bulge on the side close to the center of the pot body is shorter, the total area of the bulge of the stirring member is reduced to a certain extent, such that easy cleaning is achieved.

In an embodiment, the stirring member 5 may further include a bump 514. As shown in FIG. 23, the bump 514 is disposed on a end of the rod member 513 that is close to the opening of the pot body. An orientation of the bump 514 is not limited; and preferably the bump protrudes toward the inner wall of the pot body or toward the center of the pot body. The bump 514 is wider than the tooth-shaped structure 511, that is, a longer distance is extended along the length of the rod member 513. During actual cooking, food is easily remained on the narrow tooth-shaped structure and hard to remove, resulting in a poor cooking effect. In particular, a contact area between the opening position of the pot body and the outside world is large, and a temperature is low, such that a cooking effect of the residual dish is greatly reduced if the food remains at the opening of the pot 20. Food remaining is reduced by designing the bump 514 to be wider and disposing the bump on the end close to the opening of the pot body, thereby improving a cooking effect. According to the above, the tooth-shaped structure 511, the bulge 512, and the bump 514 are randomly combined, and the disclosure is not limited thereto.

Figure 24:
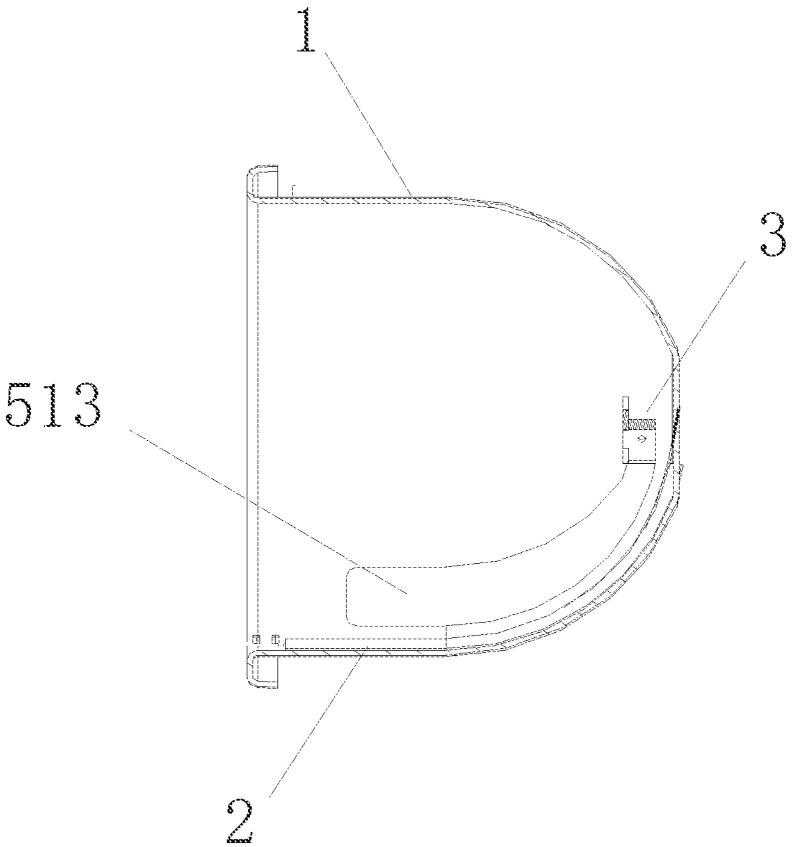
FIG. 24 is a cross-sectional view of a pot according to a seventh embodiment of the disclosure.

In some embodiments, as shown in FIG. 24, the stirring member 5 includes the rod member 513. The rod member 513 gradually increases in the direction from the bottom of the pot 20 to the opening of the pot body. The diameter of the pot body gradually increases from the bottom of the pot 20 to the opening of the pot body. The rod member 513 is arranged to gradually increase in the direction from the bottom of the pot 20 to an opening of the pot body to adapt changes in an internal space of the pot body, thereby improving the cooking effect.

Figure 19:
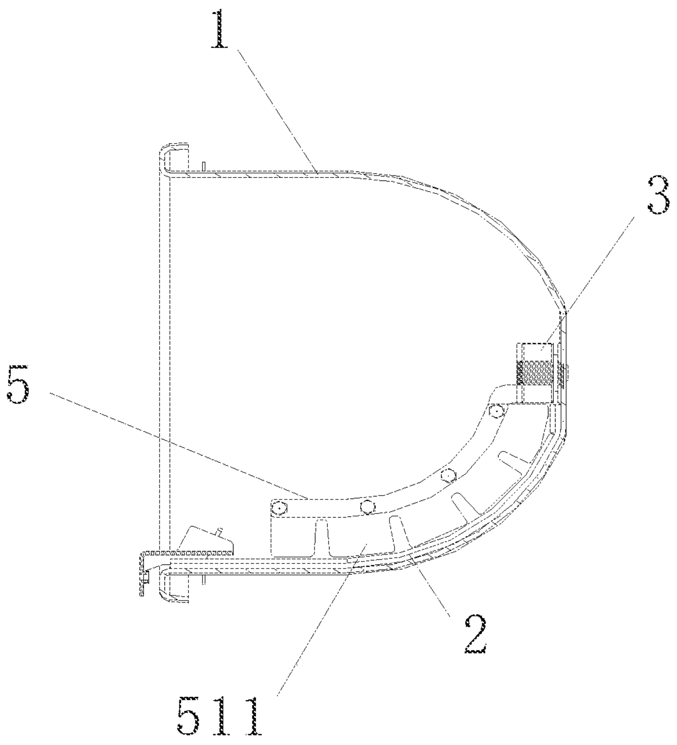
FIG. 19 is a cross-sectional view of a pot according to a second embodiment of the disclosure.

In an embodiment, the stirring member 5 includes a rigid section and a flexible section; the rigid section and the flexible section extend in a length direction of the stirring member 5; and the rigid section is located on a side of the flexible section that is close to the central axis of the pot body 1. In an embodiment, the tooth-shaped structure 511 is disposed on the side of the flexible section that is close to the inner wall of the pot body; and the tooth-shaped structure 511 extends in a length direction of the flexible section and is distributed at intervals. As shown in FIG. 19, the flexible section includes the tooth-shaped structure 511. The tooth-shaped structure 511 is more flexible when the stirring member 5 is overlapped with the pot scraping member 2, so as to increase a moving amplitude of the flexible section, thereby further reducing the probability of the hard objects stuck between the stirring member 5 and the pot scraping member 2.

Specifically, the stirring member 5 is added and fixedly connected to the pot body 1, such that stir-frying and stirring are conveniently realized during cooking; and when the pot 20 is washed, the pot 20 is conveniently washed. The shape of the stirring member 5 matches the shape of the inner wall of the pot body 1, such that the pot body 1 is stirred without dead corners. The cross-sectional shape of the stirring member 5 is triangular, and the stirring member 5 is thinner at the part closer to the pot scraping member 2, but good rigidity may be achieved. Alternatively, the cross-sectional shape of the stirring member 5 is square, and the flexibility of the stirring member 5 is better at the part closer to the pot scraping member 2. In this embodiment, the cross-sectional shape of the stirring member 5 is not limited. Therefore, the effect of stir-frying and stirring is achieved, and large pieces of hard objects conveniently cross over the stirring member 5, so as to prevent the hard objects from being stuck, thus affecting the cooking effect. There is a gap between the stirring member 5 and the inner wall of the pot body 1, such that the stirring member 5 conveniently crosses over the pot scraping member 2, and a jamming phenomenon between the large pieces of hard objects and the stirring member 5 is avoided.

The stirring member 5 is provided with the rigid section and the flexible section. The flexible section is preferably tear-resistant silicone, such that the hard objects are effectively prevented from being stuck, and conveniently cross over. The rigid section plays a role in stably supporting the stirring member 5. The rigid section is preferably made of non-toxic and harmless food grade metals. The rigid section and the flexible section are connected in a threaded manner, or fixedly connected in a clamping manner, so as to achieve convenient dismounting for usage. Through the rotation of the pot body 1, the stirring member 5 is driven to rotate accordingly, such that stir-frying and stirring during cooking are realized, and water for washing the pot 20 is stirred when the pot 20 is washed, thereby ensuring that the pot 20 is washed more cleanly.

According to an embodiment of the disclosure, in an embodiment, an automatic drum cooking system includes the pot 20 as above described. The automatic drum cooking system further includes a driving apparatus. The driving apparatus is connected to the pot 20, so as to drive the pot 20 to rotate with its own central axis as the center.

The working principle includes as follows. In the disclosure, when the pot body 1 performs cooking, the pot body 1 rotates in the circumferential direction relative to the pot scraping member 2. In addition, the pressure of 20° SA$45° is applied to the pot scraping member 2 by the elastic member 42, such that the pot scraping member 2 is completely fitted with the inner wall of the pot body 1, so as to scrape the food materials attached to the inner wall of the pot body 1, without manually using tools such as a spatula to spade the pot 20, thereby achieving simple and convenient operations, improving cooking efficiency, and reducing the intensity of manual labor. Meanwhile, after the cooking of the pot body 1 is completed, when the pot 20 is washed, the same operation is performed by the pot body 1 and the pot scraping member 2, and the pot scraping member 2 cleans the food residues on the inner wall of the pot body 1, such that the function of automatically cleaning the pot 20 is realized, thereby reducing the amount of manual labor, and improving working efficiency.

What is claimed is:

1. A cooking device, comprising:

a frame;

a base, connected to the frame;

a pot assembly, comprising a pot, the pot being configured to be connected to the base;

a first seasoning mechanism, disposed on the frame, the first seasoning mechanism being capable of quantifying solid materials, so as to convey the solid materials into the pot; and a second seasoning mechanism, disposed on the frame, the second seasoning mechanism being capable of quantifying liquid materials, so as to convey the liquid materials into the pot;

wherein the first seasoning mechanism comprises a first seasoning box and a conveying portion, and the first seasoning mechanism is configured to convey solid materials in the first seasoning box into the pot by the conveying portion, the second seasoning mechanism comprises a second seasoning box and a pump body, and the second seasoning mechanism is configured to convey liquid materials in the second seasoning box into the pot by the pump body;

in a front-rear direction of the cooking device, the first seasoning mechanism and the second seasoning mechanism are located on a rear side of the pot assembly; in a height direction of the cooking device, the second seasoning mechanism is located between the first seasoning mechanism and the pot assembly; and in a horizontal direction, the first seasoning mechanism is disposed above the pot in a protruding manner relative to the second seasoning mechanism.

2. The cooking device according to claim 1, further comprising:

a driving mechanism, wherein the pot is configured to be pivotally connected to the base, the pot assembly further comprises a rotary shaft rotatably disposed relative to the base, the rotary shaft is disposed at a bottom of the pot, and the driving mechanism is connected to the rotary shaft or the pot in a driving manner, so as to provide rotational power, the driving mechanism comprises an electric motor; and a stabilization assembly, disposed on the base, wherein the stabilization assembly comprises at least two stabilization structures sleeving on the rotary shaft, so as to reduce the shaking amplitude of the rotary shaft during rotation.

3. The cooking device according to claim 1, wherein the first seasoning mechanism comprises:

at least one feeding device, disposed on the frame and configured to supply the solid materials, wherein each of the at least one feeding device comprises a discharging port located above the pot; in the horizontal direction, the discharging port protrudes toward a front side of the cooking device; in the height direction of the cooking device, the discharging port is located between the first seasoning mechanism and the pot assembly;

there are one discharging port or multiple discharging ports, any one of the one discharging port or multiple discharging ports is right above an opening of the pot at a feeding station; and a projection of the any one of the one discharging port or multiple discharging ports on a horizontal plane is in a center region, and a ratio of an area of the center region to an area of the opening of the pot is less than 3/4.

4. The cooking device according to claim 3, wherein each of the at least one feeding device comprises:

the first seasoning box, wherein the first seasoning box is at least partially disposed in a fourth accommodating cavity of the frame, so as to store the solid materials; and the conveying portion, wherein one end of the conveying portion communicates with the first seasoning box, and the other end of the first seasoning storage portion communicates the other end of the conveying portion communicates with the pot; the conveying portion comprises a support portion, a feeding tube, and a discharging cylinder, and the discharging cylinder is provided with a discharging port;

the support portion is fixedly disposed on the first seasoning box, and the support portion is provided with a through hole; and one end of the feeding tube penetrates the support portion and communicates with the first seasoning box, and the other end of the first seasoning storage portion communicates the other end of the feeding tube communicates with the discharging cylinder.

5. The cooking device according to claim 4, wherein a seasoning falling position of the first seasoning mechanism is within a second range, and an area of the second range is less than the area of the center region; and/or there are at least two feeding devices, the at least two feeding devices are distributed in an arc shape, and the feeding devices located at two ends of the arc are disposed farther ahead relative to the feeding device located in a center of the arc; or there are at least two feeding devices, at least two discharging ports of the multiple discharging ports are distributed in an arc shape, and the discharging ports located at two ends of the arc are disposed farther ahead relative to the discharging port located in a center of the arc; and an orientation of the feeding tube is set to be symmetrically distributed along a preset plane, and the preset plane is a plane that passes through center points of a plurality of feeding devices in a left-right direction and extends in the front-rear direction.

6. The cooking device according to claim 1, wherein the second seasoning box is disposed on the frame and configured to accommodate the liquid materials; the second seasoning mechanism comprises:

a first mounting structure, disposed on the frame and provided with a first activity region;

a first joint, wherein the first joint is capable of moving in the first activity region, the first joint communicates with one end of a first pipeline, and the other end of the first pipeline adapts to communicate with the pot;

a second mounting structure, disposed on the second seasoning box and provided with a second mounting space; and a second joint, wherein the second joint is capable of moving in the second mounting space, and the second joint communicates with the second seasoning box by a second pipeline, wherein in the height direction of the cooking device, the first joint and the second joint are located between the first seasoning mechanism and the second seasoning mechanism.

7. The cooking device according to claim 6, wherein the first mounting structure comprises a first stop portion and a second stop portion, and the first stop portion and the second stop portion form the first activity region;

the second stop portion comprises at least two protruding posts; the first joint is provided with limit holes corresponding to the protruding posts; the first joint sleeves on the protruding posts by the limit holes;

the first stop portion comprises a first stop plate, and the first stop plate is located between the first joint and the second joint, so as to prevent the first joint from falling off from the protruding posts;

the second mounting structure comprises a limit base, the second joint is mounted on the second seasoning box by the limit base, and the second mounting structure is fixedly disposed on a side surface of the second seasoning box; and the second seasoning box and the second mounting structure both are disposed in a third accommodating cavity.

8. The cooking device according to claim 6, wherein the second seasoning mechanism further comprises:

the pump body, disposed on the first pipeline and disposed in the third accommodating cavity of the frame;

a first valve body, disposed on the first pipeline and located between the pump body and a nozzle assembly, wherein the first valve body is disposed close to the pump body;

a second valve body, disposed on an end of the second pipeline that stretches into the second seasoning box, wherein the first valve body and the second valve body both are one-way valves, and an opening pressure of the first valve body is greater than an opening pressure of the second valve body.

9. The cooking device according to claim 2, wherein the second seasoning box is disposed on the frame and configured to accommodate the liquid materials; the second seasoning mechanism comprises:

a first mounting structure, disposed on the frame and provided with a first activity region;

a first joint, wherein the first joint is capable of moving in the first activity region, the first joint communicates with one end of a first pipeline, and the other end of the first pipeline adapts to communicate with the pot;

a second mounting structure, disposed on the second seasoning box and provided with a second mounting space; and a second joint, wherein the second joint is capable of moving in the second mounting space, and the second joint communicates with the second seasoning box by a second pipeline, wherein in the height direction of the cooking device, the first joint and the second joint are located between the first seasoning mechanism and the second seasoning mechanism.

10. The cooking device according to claim 3, wherein the second seasoning box is disposed on the frame and configured to accommodate the liquid materials; the second seasoning mechanism comprises:

a first mounting structure, disposed on the frame and provided with a first activity region;

a first joint, wherein the first joint is capable of moving in the first activity region, the first joint communicates with one end of a first pipeline, and the other end of the first pipeline adapts to communicate with the pot;

a second mounting structure, disposed on the second seasoning box and provided with a second mounting space; and a second joint, wherein the second joint is capable of moving in the second mounting space, and the second joint communicates with the second seasoning box by a second pipeline, wherein in the height direction of the cooking device, the first joint and the second joint are located between the first seasoning mechanism and the second seasoning mechanism.

11. The cooking device according to claim 4, wherein the second seasoning box is disposed on the frame and configured to accommodate the liquid materials; the second seasoning mechanism comprises:

a first mounting structure, disposed on the frame and provided with a first activity region;

a first joint, wherein the first joint is capable of moving in the first activity region, the first joint communicates with one end of a first pipeline, and the other end of the first pipeline adapts to communicate with the pot;

a second mounting structure, disposed on the second seasoning box and provided with a second mounting space; and a second joint, wherein the second joint is capable of moving in the second mounting space, and the second joint communicates with the second seasoning box by a second pipeline, wherein in the height direction of the cooking device, the first joint and the second joint are located between the first seasoning mechanism and the second seasoning mechanism.

12. A cooking device, comprising:

a frame;

a base, connected to the frame;

a pot assembly, comprising a pot, the pot being configured to be connected to the base;

a first seasoning mechanism, disposed on the frame, the first seasoning mechanism being capable of quantifying solid materials, so as to convey the solid materials into the pot; and a second seasoning mechanism, disposed on the frame, the second seasoning mechanism being capable of quantifying liquid materials, so as to convey the liquid materials into the pot;

wherein the first seasoning mechanism comprises a first seasoning box and a conveying portion, and the first seasoning mechanism is configured to convey solid materials in the first seasoning box into the pot by the conveying portion, the second seasoning mechanism comprises a second seasoning box and a pump body, and the second seasoning mechanism is configured to convey liquid materials in the second seasoning box into the pot by the pump body;

wherein the pot comprises a pot body and a pot scraping member; the pot scraping member is provided on an inner wall of the pot body; the pot scraping member is attached to the inner wall of the pot body; and the pot body is capable of moving in a circumferential direction of the pot body relative to the pot scraping member, so as to cause the pot scraping member to scrape food materials attached to the inner wall of the pot body, the pot scraping member comprises a framework and an outer cover; the outer cover is sleeved on the framework; the framework applies a pressure to the outer cover, so as to cause the outer cover to be attached to the inner wall of the pot body; and the outer cover is made of a flexible material.

13. The cooking device according to claim 12, wherein the framework comprises a first end and a second end; the pot body comprises a bottom of the pot and an the opening of the pot; the first end is provided at the bottom of the pot, and the second end is provided at the opening of the pot; the pot further comprises a fixing member, and the fixing member is connected to the second end, so as to limit the second end in the circumferential direction of the pot body; a limit space is provided in the fixing member, and the second end is provided in the limit space; the fixing member comprises a limit column, and the limit column is located in the limit space; the second end is provided with a pressing piece, and the pressing piece is disposed on an outer wall of the second end that is close to a central axis of the pot body; the pressing piece is provided with a mating hole; the limit column stretches into the mating hole; an elastic member is sleeved on the limit column; and the elastic member applies, to the pressing piece, an elastic force towards the inner wall of the pot body, so as to cause the pot scraping member to be attached to the inner wall of the pot body.

14. The cooking device according to claim 13, wherein the pressing piece protrudes from an outer wall of the second end in a first direction; the mating hole is in a strip shape; the mating hole extends in the first direction;

a total distance, in a circumferential direction of the pot, between an inner wall of the mating hole and the limit column is A, a length of the mating hole in the circumferential direction of the pot is B, and a ratio of A to B is 0-0.2; and a total distance, in the first direction, between the mating hole and the limit column is C, the length of the mating hole in the first direction is D, and a ratio of C to D is 0.3-0.9.

15. The cooking device according to claim 13, wherein a plane perpendicular to the central axis of the pot body is a first plane; and a direction of the force applied to the pressing piece by the elastic member is at an angle A to the first plane, wherein $20° \leq A \leq 45°$.

16. The cooking device according to claim 13, wherein a fixed base is provided at the bottom of the pot; the pot further comprises a stirring member; one end of the stirring member is provided on the fixed base or the bottom of the pot, and the other end of the stirring member extends towards the opening of the pot along the inner wall of the pot body; the stirring member is capable of moving relative to the pot scraping member in the circumferential direction of the pot body; there is a gap between the stirring member and the inner wall of the pot body, so as to cause the pot scraping member to pass through the gap;

there is a gap between the stirring member and the pot scraping member;

the stirring member comprises a rigid section and a flexible section; the rigid section and the flexible section extend in a length direction of the stirring member; and the rigid section is located on a side of the flexible section that is close to the central axis of the pot body.

17. The cooking device according to claim 13, wherein a fixed base is provided at the bottom of the pot; the pot further comprises a stirring member; one end of the stirring member is provided on the fixed base or the bottom of the pot, and the other end of the stirring member extends towards the opening of the pot along the inner wall of the pot body; the stirring member comprises a rod member and a tooth-shaped structure; the rod member extends in a radial direction of the inner wall of the pot body; the tooth-shaped structure protrudes from the rod member;

the tooth-shaped structure is disposed on a side of the rod member that is close to a center of the pot body, or the tooth-shaped structure is disposed on a side of the rod member that is away from a center of the pot body, or the tooth-shaped structures are respectively disposed on two sides of the rod member;

the stirring member further comprises a bump; the bump is disposed on a end of the rod member that is close to an opening of the pot body; and a width of the bump is greater than a width of the tooth-shaped structure.

* * * * *